US011124590B2

(12) United States Patent
Averkov et al.

(10) Patent No.: US 11,124,590 B2
(45) Date of Patent: Sep. 21, 2021

(54) METHOD OF PRODUCING A MODIFIED DIENE-CONTAINING RUBBER, THE RUBBER AND A COMPOSITION BASED THEREON

(71) Applicant: PUBLIC JOINT STOCK COMPANY "SIBUR HOLDING", Tobolsk (RU)

(72) Inventors: Alexei Mikhailovich Averkov, s. Berdyanka (RU); Svetlana Viktorovna Turenko, g. Tomsk (RU)

(73) Assignee: PUBLIC JOINT STOCK COMPANY "SIBUR HOLDING", Tobolsk (RU)

( * ) Notice: Subject to any disclaimer, the term of this patent is extended or adjusted under 35 U.S.C. 154(b) by 91 days.

(21) Appl. No.: 16/347,176

(22) PCT Filed: Nov. 2, 2016

(86) PCT No.: PCT/RU2016/000743
§ 371 (c)(1),
(2) Date: May 2, 2019

(87) PCT Pub. No.: WO2018/084733
PCT Pub. Date: May 11, 2018

(65) Prior Publication Data
US 2020/0262956 A1    Aug. 20, 2020

(51) Int. Cl.
| | |
|---|---|
| *C08F 236/06* | (2006.01) |
| *B60C 1/00* | (2006.01) |
| *C08C 19/25* | (2006.01) |
| *C08F 4/48* | (2006.01) |
| *C08F 212/08* | (2006.01) |
| *C08F 230/08* | (2006.01) |
| *C08F 236/08* | (2006.01) |
| *C08K 3/04* | (2006.01) |
| *C08K 3/36* | (2006.01) |
| *C08L 83/06* | (2006.01) |

(52) U.S. Cl.
CPC .......... *C08F 236/06* (2013.01); *B60C 1/0016* (2013.01); *B60C 1/0025* (2013.01); *C08C 19/25* (2013.01); *C08F 4/48* (2013.01); *C08F 212/08* (2013.01); *C08F 230/08* (2013.01); *C08F 236/08* (2013.01); *C08K 3/04* (2013.01); *C08K 3/36* (2013.01); *C08L 83/06* (2013.01); *C08F 2810/00* (2013.01)

(58) Field of Classification Search
CPC .... C08F 136/06; C08F 136/08; C08F 136/18; C08F 36/06; C08F 36/08; C08F 36/18; C08F 236/06; C08F 236/08; C08F 236/18; C08F 236/10; C08F 297/04; C08F 212/08; C08F 230/08; C08F 4/48; C08C 19/25; B60C 1/0016; B60C 1/0025
See application file for complete search history.

(56) References Cited

U.S. PATENT DOCUMENTS

| | | |
|---|---|---|
| 4,174,431 A | 11/1979 | Halasa et al. |
| 4,523,618 A | 6/1985 | Yamamoto et al. |
| 4,575,534 A | 3/1986 | Oshima et al. |
| 4,647,635 A | 3/1987 | Hall |
| 5,066,721 A | 11/1991 | Hamada et al. |
| 5,422,403 A | 6/1995 | Hsu et al. |
| 5,514,756 A | 5/1996 | Hsu et al. |
| 5,541,264 A | 7/1996 | Hsu et al. |
| 5,717,043 A | 2/1998 | Nakayama et al. |
| 6,602,942 B1 | 8/2003 | Karato |
| 6,800,689 B2 | 10/2004 | Inagaki et al. |
| 7,915,349 B2 | 3/2011 | Yamada et al. |
| 8,765,892 B2 | 7/2014 | Oshima |
| 8,815,977 B2 | 8/2014 | Ito et al. |
| 2009/0247696 A1 | 10/2009 | Fujii et al. |
| 2012/0190771 A1* | 7/2012 | Ito .................... C08F 236/06 523/150 |
| 2015/0005440 A1 | 1/2015 | Fujii |
| 2016/0009903 A1 | 1/2016 | Morita et al. |
| 2016/0264601 A1 | 9/2016 | Rossle et al. |

FOREIGN PATENT DOCUMENTS

EP     0594107     4/1994

OTHER PUBLICATIONS

Datta et al. (2001). "Section 6.7—Plasticisers and softeners" Chapter 6 in Rubber Technologist's Handbook. De et al. ed., Rapra Technology Limited, pp. 198-200.
Datta et al. (2001). "Rubber Additives—Compounding Ingredients," Chapter 6 in Rubber Technologist's Handbook. De et al. ed., Rapra Technology Limited, pp. 167-203.
Dick, John S. (2001) "Compound Processing Characteristics and Testing" Chapter 2 in Rubber Technology. Hanser Publishers, pp. 17-45.
Hayashi et al. (2011). "Development and Foresight of Solution SBR for Energy-Saving Tires," Sumitomo Kagaku vol. 1: 10 pages.
International Search Report and Written Opinion dated Aug. 17, 2017, directed to PCT/RU2016/000743; 7 pages.

* cited by examiner

*Primary Examiner* — Kuo Liang Peng
(74) *Attorney, Agent, or Firm* — Morrison & Foerster LLP

(57) ABSTRACT

The present invention relates to a method of producing a rubber, comprising (co)polymerizing at least one diene monomer and optionally at least one vinylaromatic monomer, and a vinyl-silicone compound, in the presence of a functionalizing lithium initiator, and modifying the obtained (co)polymer by a poly functional silicon-containing agent. The functionalizing lithium initiator is obtained by reacting an organolithium compound, a secondary amine and a diene-containing compound. In addition, the instant inventon relates to rubbers obtained by said method, rubber compositions and vulcanizates based thereon, semi-finished products and tires, comprising such a rubber. The present invention provides obtaining of rubber compositions and vulcanizates based thereon characterized by the improved complex of histeresis properties.

40 Claims, No Drawings

METHOD OF PRODUCING A MODIFIED DIENE-CONTAINING RUBBER, THE RUBBER AND A COMPOSITION BASED THEREON

CROSS-REFERENCE TO RELATED APPLICATIONS

This application is a U.S. national phase patent application of International Patent Application No. PCT/RU2016/000743, filed Nov. 2, 2016, of which is hereby incorporated by reference in the present disclosure in its entirety.

FIELD OF THE INVENTION

The present invention relates to the field of producing rubbers by a method of solution polymerization, and also rubber compositions and vulcanizates based thereon, industrial rubber articles, semi-finished products and tires comprising rubber which are characterized by the improved complex of hysteresis properties. Particularly, the invention relates to a method of producing a modified rubber by a method of solution anionic (co)polymerization of at least one diene monomer and optionally at least one vinyl aromatic monomer in the presence of a vinyl-silicone compound as a polar comonomer, with use of a functionalizing lithium initiator that is preliminary obtained or is obtained in the reaction mixture by reacting an organolithium compound, a secondary amine and a diene-containing compound, followed by the end modification of the rubber using a polyfunctional silicon-containing agent, in particular, oligo- or polysiloxane.

BACKGROUND OF THE INVENTION

The important property of vulcanizates for tire treads is the good wet road grip. At the same time, the important factor is the improvement of the road grip without the worsening the rolling resistance index and abrasive wear. The cornering tire property on wet road and rolling resistance in significant degree depend upon properties and structure of rubbers, which are used in the manufacture of vulcanizates for tire treads.

Recently, from the point of view of increasing the fuel economy, improving the wet road grip, lowering the rolling resistance of tires, the extending of tires with a precipitated colloidal silica and/or carbon black is the most commonly used. However, as it is known, these fillers, in particular precipitated colloidal silica, have a low affinity to polymers, including rubbers. In view of this, the interaction of rubbers with the filler is low, the dispersion of the filler in rubbers is difficult and the improvement of properties seems to be unsatisfactory. The solution of the problem has been discovered in the modification of rubbers by modifying the rubbers with polar functional groups of different nature.

As it is indicated above, significant improvement of physical and mechanical properties of vulcanizates for tire treads, including their hysteresis properties, due to the increase in the interaction/affinity of rubber with a filler, is provided by the fictionalization of the rubber at the step of synthesis thereof. With this purpose, upon the synthesis of the rubber, various functionalizing agents are used, in particular initiators and monomers comprising functional groups, including amino groups, hydroxyl groups, siloxane groups, epoxide groups and the like, which allow to functionalize the rubber along and at the ends of a polymer chain, and also coupling or branching agents reacting with "living" polymer and modifying it at the ends of chain (HAMA H., INAGAKI K. Development and Foresight of Solution SBR for Energy-Saving tires.//Sumitomo Kagaku.—2011.—V. 1.—P. 1-10).

Use of functionalizing lithium initiators, in particular, lithium amides, which use in the polymerization process increases the polarity of the obtained rubber, that in turn provides improving hysteresis properties of vulcanizates obtained on the basis thereof, is known.

The prior art, namely EP0594107 A1, published on Apr. 27, 1994 and U.S. Pat. No. 5,717,043 A, published on Feb. 10, 1998, discloses processes of preparing a rubber comprising (co)polymerizing a conjugated diene monomer and/or a vinylaromatic monomer in the presence of an initiator that is formed directly in the polymerization medium by bringing an organolithium compound (for example, methyl lithium, ethyl lithium, propyl lithium, n-butyl lithium and the like) into contact with a secondary amine (for example, dimethylamine, pyrrolidine, piperidine and the like). According to these solutions, the modification of a rubber is also further carried out by adding coupling agents and/or electrophilic agents to the rubber after the termination of the polymerization reaction. Coupling agents are low-molecular organosilicon and organotin compounds, and also halogenides of tin and silicon. According to the proposed solutions, amides, isocyanates, esters and the like are used as electrophilic agents. The process of preparing and modifying a rubber presented in the indicated solutions provides obtaining of vulcanizates, the rolling resistance of which is up to 9% less than the vulcanizates comprising unmodified rubber have.

The prior art also discloses a method of the functionalization of a rubber along a chain by the use of polar comonomers comprising functional groups. For example, according to application US2009247696 A1, published on Oct. 1, 2009, silicon-containing compounds are used as the comonomer to functionalize the rubber, these compounds have general formula (Ia):

wherein $X^4$, $X^5$, $X^6$ independently represent a group that may be represented by the formula (IIa):

wherein $R^8$ and $R^9$ independently represent an optionally substituted hydrocarbon group having 1 to 6 carbon atoms, an optionally substituted silyl group and/or $R^8$ and $R^9$ may be coupled to form a ring structure with a nitrogen atom. Alkyllithium is used as the initiator, and the possibility of use of lithium amides is mentioned.

A process for producing a functionalized rubber is presented in the invention disclosed in U.S. Pat. No. 8,815,977 B2, published on Aug. 26, 2014, the process comprises the use of a functionalizing lithium initiator, and also a polar comonomer. In accordance with the invention, the functionalizing lithium initiator represents a compound of formula (IIIa)

wherein $R^{11}$ represents a hydrocarbon group having 6 to 100 carbon atoms, $R^{12}$ and $R^{13}$ represent a optionally substituted hydrocarbon group or a trihydroxysilyl group, or $R^{12}$ and $R^{13}$ are coupled together and represent a bivalent hydrocarbon group optionally having as a heteroatom at least one atom selected from silicon, nitrogen and/or oxygen, M is an alkali metal. Compounds of the general formula (IVa):

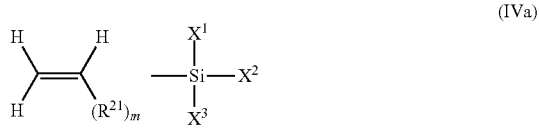

wherein $R^{21}$ represents a hydrocarbon group, m is an integer 0 or 1; $X^1$, $X^2$ and $X^3$ represent a substituted amino group, an optionally substituted hydrocarbon group,
are used as the polar comonomer.

Methods for functionalizing rubbers, in which, in addition to silicon-containing compounds, other polar comonomers comprising functional groups are used, are also known. For example, according to patent U.S. Pat. No. 8,765,892 B2, published on Jun. 1, 2014, the compounds having general formula (Va):

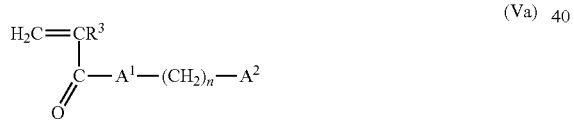

wherein $A^1$ represents an oxygen atom or an —$NR_4$-group ($R_4$ represents a hydrogen atom or a hydrocarbon group having 1 to 10 carbon atoms), and $A^2$ represents a functional group comprising a nitrogen atom and/or an oxygen atom,
are used as the polar comonomer in addition to the silicon-containing comonomer.

According to application US20150005440 A1, published on Jan. 1, 2015, compounds of general formula $E^2$-$A^2$ and $E^3$-$A^3$ are used, wherein $E^2$ and $E^3$ are hydrocarbon groups comprising polymerizable double bonds, $A^2$ is a heterocyclic group comprising a nitrogen atom, $A^3$ is a heterocyclic group comprising a substituted silyl group, are used as the polar comonomers.

One of disadvantages of the aforesaid methods is the necessity of use of a large excess of an electron-donor additive to provide a high content of 1,2-units in the rubber. The content of 1,2-units is one of the most important characteristics of the rubber, since tires made of the rubber having the high content of 1,2-units, first of all, have the good road grip. According to all the presented methods, an electron-donor additive representing a mixture of tetrahydrofuran (THF)/ethylene glycol diethyl ether (EGDEE) with a molar ratio of 1:2 is used in order to obtain a rubber having 60% of 1,2 units upon polybutadiene portion. It is required to use the sevenfold excess of the indicated mixture of the electron-donor additive, relative to the initiator to achieve the claimed amount of 1,2-units. Probably, the use of the excessive amount of the mixture of the electron-donor additive is the consequence of the fact that there is the great difference between boiling temperatures of components in the THF/EGDEE mixture ($T_{boil}$(THF)=66° C., $T_{boil}$(EGDEE)=121° C.), which leads to their non-uniform distribution in the polymerization medium. The co-distillation of a solvent and THF will also be carried out upon the recuperation of the solvent, whereas the EGDEE will remain in the reaction mixture with the rubber, which subsequently involves the necessity of determining the concentration of the THF in the solvent to calculate an amount of the EGDEE that is once again added to maintain the specific THF/EGDEE molar ratio.

It should be noted that according to the aforesaid documents US2009247696, U.S. Pat. Nos. 8,815,977, 8,765,892 the modification of the rubber at the ends of a polymer chain is additionally used. Silicon- and/or tin-containing low-molecular agents are used for this purpose. However, the similar solutions do not achieve the significant improvement in the affinity of the rubber to the filler.

The closest prior art to the present invention is a method for producing a modified rubber described in application US20160009903 A1, published on Jan. 14, 2016. The "living" polymer obtained with the use of an amide of an alkali metal or an alkali earth metal as an initiator is subjected to the double modification at the ends of chain, by adding compounds comprising an atom providing the good interaction with the filler (for example, silicon, nitrogen, sulfur, phosphorus). The compound for the first modification may have a heterocyclic, polyether, amine, polysiloxane structure, a polyhydric structure and the like. The compound for the second modification represents an alkoxysilane of the following formula:

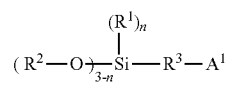

wherein $A^1$ is a monovalent functional group comprising at least one atom selected from a nitrogen atom, a sulfur atom, a phosphorus atom; $R^1$ and $R^2$ are an $C_{1-20}$ alkyl group, $C_{2-20}$ alkenyl group, $C_{3-20}$ cycloalkyl group, $C_{6-20}$ aryl group or aralkyl group, $R^3$ is an $C_{1-20}$ alkanediyl group, $C_{2-20}$ alkenediyl group, $C_{3-20}$ cycloalkyl group or $C_{6-20}$ aryl group. The disadvantage of this technical solution is the use as initiators of the preliminary obtained lithium amides, which are poorly soluble in nonpolar organic solvents used during the polymerization process. The poor solubility of lithium amides in solvents involves the precipitation thereof, which in turn impedes the quantitative dosing of the initiator during the synthesis. Thus, the concentration (activity) of the initiator will not be constant within the whole volume of the reaction mixture, which will result in the worsening of molecular mass characteristics of the rubber. Furthermore, the lack of the rubber functionalization along the polymer chain results in the lesser interaction of the rubber with the filler, which in turn has the negative influence on the tire rolling resistance. Additionally, the two-stage modification by two individual agents increases the time expended for the obtaining of the rubber, the cost, and also increases the difficulty of the carrying out the process.

Thus, there is a need in developing the easy-to-implement and cost efficient method of producing a rubber that avoids the aforesaid disadvantages and simultaneously improves the physical and mechanical properties of the rubber by means of providing the functionalization and modification of the obtained rubber both at the beginning and at the ends, and along the whole length of the polymer chain, wherein the functionalization and modification are sufficient to improve the affinity and interaction between the rubber and filler (in particular, the silica), and also the need for compositions and articles comprising such rubber.

SUMMARY OF THE INVENTION

The present invention provides a method of producing a rubber, comprising:
a) (co)polymerizing:
at least one diene monomer,
optionally at least one vinylaromatic monomer, and
a vinyl-silicone compound,
in the presence of a functionalizing lithium initiator, and
b) modifying the obtained (co)polymer by a polyfunctional silicon-containing agent, wherein the functionalizing lithium initiator is obtained by reacting an organolithium compound, a secondary amine and a diene-containing compound.

According to one of embodiments of the present invention, the (co)polymerization represents an anionic (co)polymerization in solvent.

In one of embodiments of the present invention, the diene monomer represents a compound selected from the group consisting of conjugated dienes having from 4 to 12 carbon atoms.

In one of embodiments of the present invention, the vinylaromatic monomer represents a compound selected from the group comprising: styrene, α-methylstyrene, ortho-, meta- and para-methylstyrene, 3-vinyl toluene, ethylvinyl benzene, 4-cyclohexyl styrene, para-tert-butyl styrene, methoxy styrene, vinyl mesitylene, divinyl benzene, 1-vinyl naphthalene, 2,4,6-trimethyl styrene.

According to the following embodiment of the present invention, the vinyl-silicon compound participating in the (co)polymerization process is a compound represented by the general formula (I):

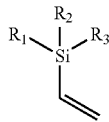

(I)

wherein $R_1$ and $R_2$ are the same or different and represent an optionally substituted $C_{1-20}$ alkyl, $C_{2-20}$ alkenyl, $C_{3-20}$ cycloalkyl, $C_{6-20}$ aryl, $C_{5-20}$ heterocyclyl, $C_{5-20}$ heteroaryl, or $NR_6R_7$, or $R_1$ and $R_2$ in combination with each other form a 3- to 8-membered saturated or unsaturated ring consisting of the carbon atoms and, optionally, of 1 to 3 atoms selected from an oxygen atom, a sulfur atom and a nitrogen atom; $R_3$ represents $NR_6R_7$, wherein $R_6$ and $R_7$, the same or different and represent optionally substituted $C_{1-8}$-alkyl, $C_{2-8}$ alkenyl, $C_{3-8}$ cycloalkyl, $C_{6-10}$ aryl, $C_{5-10}$ heterocyclyl, $C_{5-10}$ heteroaryl.

In addition, in accordance with one of variants of the present invention, the organolithium compound used in the obtaining of the functionalizing initiator is $C_{1-20}$ alkyllithium, $C_{6-10}$ aryllithium, $C_{2-20}$ alkenyllithium, $C_{2-20}$ alkylene dilithium compounds.

In accordance with another variant of the present invention, the secondary amine used in the obtaining of the functionalizing initiator is a compound of the general formula (II):

(II)

wherein $R_a$ and $R_b$ independently represent optionally substituted $C_{1-20}$ alkyl, $C_{2-20}$ alkenyl, $C_{3-20}$ cycloalkyl, $C_{6-20}$ aryl, $C_{5-20}$ heterocyclyl, $C_{5-20}$ heteroaryl, or $R_a$ and $R_b$ in combination with each other form a 3- to 20-membered saturated or unsaturated ring consisting of carbon atoms and, optionally, of 1 to 3 atoms selected from an oxygen atom, a sulfur atom and a nitrogen atom, said ring optionally comprises 1 to 5 substituents selected from halogen, $C_{1-6}$ alkyl, $C_{1-6}$ alkoxy and $C_{6-10}$ aryl.

In accordance with one of variants of the present invention, the diene-containing compound used in the obtaining of the functionalizing initiator is selected from the group consisting of conjugated dienes having 4 to 12 carbon atoms.

Further, one of variants of the present invention provides a method, wherein the functionalizing initiator is preliminary obtained or is obtained in situ in the reaction mixture by reacting an organolithium compound, a secondary amine and diene in an equimolar amount in the presence of an electron-donor additive and a solvent.

In accordance with the further variant of the present invention, the diene-containing compound used in the manufacture of the functionalizing initiator is the diene monomer of step (a) of the (co)polymerization.

In accordance with one of variants of the present invention, the polyfunctional silicon-containing agent is a compound of the general formula (III):

(III)

wherein $R^1$-$R^8$ are the same or different and represent alkoxy group having an alkyl chain $C_{1-20}$ and/or alkyl $C_{1-20}$ and/or aryl $C_{6-12}$ groups; $X_1$-$X_4$ are the same or different and represent epoxy, epoxy$C_{1-20}$alkyl, epoxy$C_{1-20}$alkyleneoxoalkyl or epoxy-$C_{6-12}$aryl groups, for example

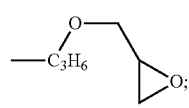

m, n, k are the same or different and represent an integer of from 0 to 500, preferably from 2 to 100, more preferably from 4 to 50.

In accordance with one more variant of the present invention, the (co)polymerization and obtaining of the functionalizing initiator is carried out in the presence of an electron-donor additive.

In one of variants of the present invneiton, a method of producing a rubber comprises:
feeding to a polymerization reactor:
i) at least one diene monomer,
ii) optionally at least one vinylaromatic monomer, and
iii) a vinyl-silicon compound;
introducing a functionalizing initiator into a reaction mixture in the polymerization reactor; and
introducing a polyfunctional silicon-containing agent into the reaction mixture until a conversion degree of at least one monomer and vinyl-silicon compound reaches 95% and more. In addition, a rubber obtained by the aforesaid method and a rubber composition comprising this rubber and at least one functional additive are provided.

The present invention also relates to a rubber composition suitable for producing rubber articles, comprising:
a rubber obtained by the (co)polymerization of at least one diene monomer and optionally at least one vinylaromatic monomer and a vinyl-silicon compound in the presence of a functionalizing lithium initiator, and by the subsequent modification of the (co)polymer by a polyfunctional silicon-containing agent, wherein the functionalizing lithium initiator is obtained by reacting an organolithium compound, a secondary amide and a diene-containing compound, and
at least one functional additive.

One of variants of the present invention provides a composition further comprising butadiene and/or styrene and/or isoprene rubber.

Further, the present invention relates to a semi-finished product for tire, to a tire tread and a tire, each comprising the rubber composition according to the present invention.

In one of variants of the present invention, the semi-finished product is a tread, breaker or sidewall.

Other special aspects, features and advantages of the present invention will be disclosed more fully in the following disclosure of the invention.

Disclosure of the Invention

It is an object of the present invention to develop a method of producing a modified rubber by a method of the solution anionic (co)polymerization of at least one diene monomer and optionally at least one vinylaromatic monomer, and also rubber compositions and vulcanizates based thereon with the improved complex of hysteresis properties, in particular the rolling resistance and wet road grip, for the manufacture of articles and tires.

Technical result of the present invention consists in the improvement of hysteresis characteristics of vulcanizates based on the rubbers produced by the claimed method, which provides reducing the rolling loss in the case of treads and other elements of the vehicle tire, and provides reducing the hysteresis loss during the use of the tires and rubber articles operating under dynamic conditions, and provides improving the adhesion properties of treads. The improvement in hysteresis properties appears in the lowering of mechanical loss-angle tangent at 60° C. (rolling resistance) by at least 5-10% and in the increase of mechanical loss-angle tangent at 0° C. (wet road grip) by at least 5-10%.

The indicated object is solved and the technical result is achieved due to the complex functionalization of the rubber at the polymerization step, namely as the result of use of a functionalizing initiator and a polar comonomer, followed by the modification of "living" (co)polymer by a polyfunctional silicon-containing agent.

According to the present invention, the functionalizing initiator represents a compound that comprises an amino group and that is preliminary obtained or is obtained in the reaction mixture by reacting an organolithium compound, a secondary amine and a diene-containing compound. The obtained initiator has a good solubility in solvents used during the anionic polymerization, due to diene units contained in the structure thereof.

A process of producing said rubber comprises the polymerization step of at least one diene monomer and optionally at least one vinylaromatic monomer, using a functionalizing initiator, a polar comonomer representing a vinyl-silicon compound, followed by the modification of the obtained "living" (co)polymer by a polyfunctional silicon-containing agent.

Diene monomers and/or vinylaromatic monomers in a weight ratio of the vinylaromatic monomers to a diene monomers from 0 to 1, preferably from 0.1 to 0.9, more preferably from 0.2 to 0.7 are used as the initial monomers.

Conjugated dienes having 4 to 12 carbon atoms are used as the diene monomers. For example: 1,3-butadiene, 2-methyl-1,3-butadiene (isoprene), 2-ethyl-1,3-butadiene, 2,3-di($C_{1-5}$alkyl)-1,3-butadienes such as 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, 1,3-pentadiene, 2,4-hexadiene, 2-methylpentadiene, 4-methyl-pentadiene and the like. Preferably, 1,3-butadiene or isoprene are used.

The following compounds are used as the vinylaromatic monomers, namely: styrene, α-methylstyrene, ortho-, meta- and para-methylstyrene, 3-vinyl toluene, ethylvinyl benzene, 4-cyclohexyl styrene, para-tert-butyl styrene, methoxystyrenes, vinylmesitylene, divinylbenzene, 1-vinylnaphthalene, 2,4,6-trimethylstyrene and the like. Preferably styrene or α-methylstyrene are used.

It is preferable to use diene monomers and vinylaromatic monomers having a purity degree of 99.5% and more and a water content of 500 ppm and less.

A vinyl-silicon compound having the general formula (I) is used as the polar comonomer

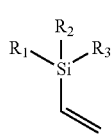

(I)

wherein $R_1$ and $R_2$ may be the same or different and represent optionally substituted $C_{1-20}$alkyl, $C_{2-20}$alkenyl, $C_{3-20}$cycloalkyl, $C_{6-20}$aryl, $C_{5-20}$heterocyclyl, $C_{5-20}$heteroaryl; $NR_6R_7$, or $R_1$ and $R_2$ in combination with each other form a 3- to 8-membered saturated or unsaturated ring consisting of the carbon atoms and, optionally, of 1 to 3 atoms selected from an oxygen atom, a sulfur atom and a nitrogen atom;

$R_3$ represents $NR_6R_7$, wherein $R_6$ and $R_7$, the same or different and represent optionally substituted $C_{1-8}$alkyl, $C_{2-8}$alkenyl, $C_{3-8}$cycloalkyl, $C_{6-10}$aryl, $C_{5-10}$heterocyclyl, $C_{5-10}$heteroaryl.

Particularly, the suitable vinyl-silicon compounds are vinylaminosilanes, preferably the vinyl-silicon compound is vinyl(C$_{1-20}$)alkyl-di((C$_{2-20}$)alkylamino)silane, vinyl-di(C$_{1-20}$)alkyl-((C$_{1-20}$)alkylamino)silane or vinyl-tris((C$_{1-20}$)alkylamino)silane.

Within the scope of the present description, the term "alkyl" means a group with a straight or branched chain having 1 to 20 carbon atoms, preferably 1 to 10 carbon atoms, more preferably 1 to 6 carbon atoms.

The term "alkenyl" means a group with a straight or branched chain having 2 to 20 carbon atoms and 1 to 5 double bounds, preferably 2 to 10 carbon atoms, more preferably from 2 to 6 carbon atoms.

The term "alkynyl" means a group with a straight or branched chain having 2 to 20 carbon atoms and 1 to 3 triple bounds, preferably 2 to 10 carbon atoms, more preferably 2 to 6 carbon atoms.

The term "cycloalkyl" means monocyclic, bicyclic or tricyclic hydrocarbon groups comprising 3 to 20 carbon atoms, each of which may comprise one or more double and/or triple carbon-carbon bonds.

The term "alkoxy group" means an —O-alkyl.

The term "aryl" means an optionally fused aromatic group having from 6 to 20 carbon atoms, preferably a phenyl group, naphthyl group, biphenyl group, dihydronaphthyl group or tetrahydronaphthyl group.

The term "heteroaryl" means an unsaturated or partly unsaturated mono- or bicyclic group having 5 to 20 members in the ring comprising 1 to 4 heteroatoms selected from a nitrogen atom, an oxygen atom or a sulfur atom, such as pyridyl, pyrrolyl, thiophenyl, oxadiazolyl and the like.

The expression "optionally substituted" means that these groups are substituted with 1-5, preferably 1-3 similar or different substituents selected from C$_{1-6}$ alkyl with a straight or branched chain, C$_{1-6}$ alkoxy with a straight or branched chain, nitro, halogens, amino (substituted with two groups of C$_{1-6}$ alkyl with a straight or branched chain), C$_{1-6}$ aminoalkyl with a straight or branched chain (substituted at the nitrogen atom with one or two groups of C$_{1-6}$ alkyl with a straight or branched chain), C$_{1-6}$thioalkyl with a straight or branched chain (substituted at the sulfur atom with the group of C$_{1-6}$alkyl with a straight or branched chain), or C$_{1-6}$hydroxyalkyl with a straight or branched chain (substituted at the oxygen atom with the group of C$_{1-6}$ alkyl with a straight or branched chain).

Suitable polar comonomers are, but are not limited to: vinyl(dimethyl amino)dimethylsilane, bis(dimethylamino)vinylmethylsilane, vinyl-tris(dimethylamino)silane, vinyl(dimethylamino)diethylsilane, bis(dimethylamino)vinylethylsilane, vinyl(diethylamino)dimethylsilane, bis(diethylamino)vinylmethylsilane, vinyl-tris(diethylamino)silane, vinyl(diethylamino)diethylsilane, bis(diethylamino)vinylethylsilane, vinyl(dimethylamino)diphenylsilane, bis(dimethylamino)vinylphenylsilane, vinyl(diphenylamino)dimethylsilane, bis(diphenylamino)vinylmethylsilane, vinyl-tris(diphenylamino)silane and the like. Preferably, bis(dimethylamino)vinylmethylsilane is used.

An amount of the used polar comonomer representing a vinyl-silicon compound is varied within the range between 0.001 and 10 wt. %, preferably between 0.01 and 1 wt. %, more preferably between 0.03 and 0.1 wt. % based on the total amount of monomers. The amount of the polar comonomer is defined by the amount of the used initiator, since the equimolar ratio of the initiator:polar comonomer shall be maintained to provide each macromolecule of the polymer with at least one molecule of the polar comonomer.

The term "equimolar ratio" means the molar ratio of components that is 1:1. The term "equimolar amount" means the amount of components providing the equimolar ratio.

It is preferably to use the polar comonomer having a purity degree of 98% and more and a moisture content of 50 ppm and less.

In accordance with the present invention, the functionalizing initiator is preliminary obtained or is obtained directly in the polymerization reactor in a reaction mixture in situ. In case of the preliminary obtaining of the functionalizing lithium initiator, the equimolar amount of an organolithium compound is reacted with a secondary amine in the presence of a polar additive and a solvent. Then, a diene-containing compound that preferably is a conjugated diene is added to the obtained reaction mass. Thereafter, the polar additive is removed by distillation under vacuum, and the obtained functionalizing lithium initiator is used for the synthesis of rubbers.

In case of the carrying out the synthesis of the initiator in the reaction mixture in situ, it is not necessary to remove, distill the polar additive under vacuum, since an electron-donor additive used upon the polymerization acts as the polar additive. The reaction of the secondary amine with the organolithium compound and the further reaction with the diene-containing compound occurs directly in the process of producing a polymer in the reaction mixture. In order to obtain the initiator in situ, the electron-donor additive and secondary amine are added to a monomer charge in the reactor, then the organolithium compound is added, wherein the subsequent formation of the lithium amide, and then—formation of the functionalizing organolithium initiator occurs in the reaction mixture, as the result of the reaction of the obtained lithium amide with the diene monomer that is present in the charge. It should be noted that in case of the obtaining of the initiator in situ in the reaction mixture, the (co)polymerized diene monomer acts as a diene-containing compound used upon the preliminary obtaining of the initiator.

In order to obtain the initiator, the following compounds are used as an organolithium compound: alkyllithium compounds representing C$_{1-20}$alkyllithium, C$_{6-10}$aryllithium, C$_{2-20}$alkenyllithium, C$_{2-20}$alkylene dilithium and C$_{2-20}$alkenylene dilithium compounds, in particular, methyllithium, ethyllithium, propyllithium, n-butyl lithiumm, sec-butyl lithium, tert-butyl lithium, n-hexyl lithium, n-octyl lithium and the like; aryllithium compounds representing: phenyllithium, tolyllithium and the like; alkenyllithium compounds representing: vinyllithium, propenyllithium and the like; alkylene dilithium compounds representing: tetramethylene dilithium, pentamethylene dilithium, hexamethylene dilithium, decamethylene dilithium and the like. Preferably, n-butyl lithium or sec-butyl lithium are used.

Secondary amines, which are used for producing the initiator, are amines having the general formula (II)

wherein R$_a$ and R$_b$ independently represent optionally substituted C$_{1-20}$alkyl, C$_{2-20}$alkenyl, C$_{3-20}$cycloalkyl, C$_{6-20}$aryl, C$_{5-20}$heterocyclyl, C$_{5-20}$heteroaryl, or R$_a$ and R$_b$ in combination with each other form a 3- to 20-membered saturated or unsaturated ring consisting of carbon atoms and optionally 1 to 3 atoms selected from an oxygen atom, a sulfur atom and a nitrogen atom, said ring is optionally substituted with 1 to 5 substituents selected from halogen, $C_{1-6}$ alkyl, $C_{1-6}$ alkoxy and $C_{6-10}$ aryl. The suitable secondary amines are, but are not limited to, dimethylamine, diethylamine, dipropylamine, di-n-butylamine, diisobutylamine, dipentylamine, dihexylamine, diheptylamine, dioctylamine, dicyclohexylamine, N,N-butylisopropylamine, dibenzylamine, methylbenzylamine, methylhexylamine, ethylhexylamine and the like. Preferably, amines wherein $R_a$, $R_b$ are an aliphatic hydrocarbon group having 1 to 10 carbon atoms, for example, dimethylamine, diethylamine, dipropylamine, diisopropylamine, di-n-butylamine, dipentylamine, methylhexylamine, ethylhexylamine and the like, are used as the secondary amines. More preferably, dimethylamine, diethylamine, dipropylamine, diisopropylamine, di-n-butyl amine are used. In addition, examples of the secondary amines are pyrrolidine, piperidine, hexamethyleneimine, 2-methylpiperidine, morpholine, thiomorpholine, N-methylpiperazine, N-phenylpiperazine and the like. Preferably, pyrrolidine, piperidine, hexamethyleneimine are used.

Conjugated dienes having 4 to 12 carbon atoms, for example, 1,3-butadiene, 2-methyl-1,3-butadiene (isoprene), 2-ethyl-1,3-butadiene, 2,3-di($C_{1-5}$alkyl)-1,3-butadienes, such as 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, 1,3-pentadiene, 2,4-hexadiene, 2-methyl-pentadiene, 4-methyl-pentadiene and the like, are preferably used as diene-containing compounds used in the manufacture of the initiator.

The following compounds are used as the polar additive upon the preliminary obtaining of the initiator: ditetrahydrofurylpropane (DTHFP), dimethyl ether, diethyl ether, methyl tert-butyl ether, tetrahydrofuran (THF), tertiary amines, for example, trimethylamine, N-methyldiethylamine and other ethers or tertiary amines having a boiling point lower than 80° C., which provides removing the polar additive after conducting the reaction of producing the functionalizing initiator by distillation under vacuum. The distillation of the polar additive provides obtaining of the initiator stable for storage. For example, in case of use as the polar additive of the THF without the distillation of the polar additive, the activity of initiator is down by 20% for a day, whereas upon the distillation of the THF the activity of initiator is kept constant for at least a week. The unreacted amide, diene oligomer having lithium atom and "amine" moiety, and non-distilled residues of electron-donor additive can also be presented in the initiator after the distillation of the electron-donor additive is performed.

In case of the preliminary obtaining of the functionalizing lithium initiator, the same solvents, as well as during the polymerization process are used as the solvents.

An amount of the used initiator is defined by the required molecular weight of the rubber and by the presence of impurities in initial components. Preferably, the amount of the used initiator is varied within the range of 1 to 50 mole/t rubber, preferably 2 to 25 mole/t rubber, more preferably 3 to 10 mole/t rubber.

As example, the functionalizing initiator according to the present invention may have non-limiting approximate structure Pir-(Bd)$_t$-Li, wherein Pir is a pyrrolidine moiety, Bd is a butadiene moiety, t represents an integer of from 1 to 10, Li represents lithium.

The following compounds are used as the electron-donor additive during the polymerization process: bis-(2-oxolanyl) methane, 2,2-bis-(2-oxolanyl)propane (ditetrahydrofurylpropane-DTHFP), 1,1-bis(2-oxolanyl)ethane, 2,2-bis-(2-oxolanyl)butane, 2,2-bis(5-methyl-2-oxolanyl)propane, 2,2-bis(3,4,5-trimethyl-2-oxolanyl)propane, tetrahydrofuran, dialkyl ethers of mono- and oligoalkylene glycols, for example, dimethyl ether and dibutyl ether of diethylene glycol, crown ethers, for example, 1,4,7,10-tetraoxacyclododecane, tertiary amines, for example, tetramethylenediamine, linear oligomers of tetrahydrofuran and the like. It is preferable to use tetramethylenediamine, THF, DTHFP.

A molar ratio of an amount of the electron-donor additive to the initiator is from 0 to 10, preferably from 0.1 to 5, more preferably from 0.5 to 2.

Solvents that preferably have the purity of 99% and more and represent saturated hydrocarbons, for example, pentane, hexane, heptane and the like; cycloaliphatic hydrocarbons, for example cyclopentane, methylcyclohexane and the like; aromatic hydrocarbons such as benzene, toluene, p-xylene, and the like, including the mixtures of the indicated compounds in the various ratios, are used as the solvents for carrying out the anionic polymerization process. Petroleum solvent representing a mixture of solvents is the most preferable. For example, the petroleum solvent of hexane-heptane fraction P1-$^{65}/_{75}$. A weight ratio of the solvent to the total amount of monomers is from 2 to 20, preferably from 4 to 12, more preferably from 6 to 8.

A temperature mode of the polymerization is defined by a thermal effect of the exothermal polymerization reaction of a diene monomer and a vinylaromatic monomer. The polymerization process is carried out at temperature from (−30) ° C. to (+120) ° C., preferably from 0° C. to 100° C., more preferably from 15° C. to 80° C. The polymerization process is carried out in an inert atmosphere upon the excess pressure ranging from 0 to 10 atm, preferably from 0.5 to 5 atm, more preferably from 1 to 3 atm.

In accordance with the proposed method, it is possible to vary the polymerization process time within the range from 10 min to 120 min, preferably from 20 min to 80 min, more preferably from 30 min to 50 min.

Preferably, the polymerization process is carried out until the conversion degree of monomers reaches 95% and more.

The polymerization process is carried out in any equipment providing batch or continuous anionic polymerization process.

An initial monomeric raw material, a polar comonomer, a solvent, an electron-donor additive may be introduced to the polymerization reactor in any sequence. Preferably, the components are introduced in the following sequence: the solvent, the initial monomeric raw material, the polar comonomer and electron-donor additive, followed by the introduction of the preliminary obtained functionalizing initiator or precursors (a secondary amine, an organolithium compound) for obtaining of the functionalizing initiator in the reaction mixture. The addition of components for the implementation of the polymerization process may also be the following: the solvent, monomers without the solvent or in the form of charge in the used solvent, the electron-donor additive, the polar comonomer; then the preliminary obtained functionalizing lithium initiator or precursors are introduced to obtain the initiator in the reaction mixture. The addition of the monomer or monomers, or the polar comonomer may also be single when the conversion amounts to 90-100%.

When the conversion degree of monomers amounts to 95% or more, the subsequent modification of "living" (co) polymer is carried out by introducing into the polymerization reactor a solution of a polyfunctional silicon-containing agent representing oligo- or polysiloxanes, preferably comprising alkoxysilyl groups and epoxy (epoxyalkyl or epoxyaryl) groups.

A number-average molecular weight of the oligo- or polysiloxane suitable for use as the polyfunctional silicon-containing agent may vary within the range from 200 to 100000 g/mole, preferably from 300 to 30000 g/mole, more preferably from 500 to 10000 g/mole. At the same time, the oligo- and polysiloxanes are liquids having a viscosity ranging from 50 to 20000 mm$^2$/sec, preferably from 100 to 10000 mm$^2$/sec, and more preferably from 200 to 5000 mm$^2$/sec.

Preferably, siloxane is funcitonalized by epoxyC$_{1-20}$alkyl, epoxyC$_{1-20}$oxoalkyl or epoxyC$_{1-20}$aryl groups.

The indicated oligo- or polysiloxanes suitable for use in the present invention may be represented by the general formula (III)

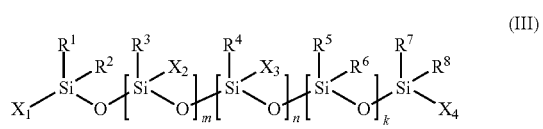

(III)

wherein R$^1$-R$^8$ are the same or different and represent alkoxy groups having an alkyl chain C$_{1-20}$ and/or alkyl C$_{1-20}$ and/or aryl C$_{5-12}$ groups; X$_1$, X$_2$ X$_3$ and X$_4$ are the same or different and represent epoxy, epoxyC$_{1-20}$alkyl, epoxyC$_{1-20}$alkyloxoalkyl or epoxyC$_{1-20}$aryl groups, wherein m, n, k are the same or different and represent an integer of from 0 to 500, preferably from 2 to 100, more preferably from 4 to 50, even more preferably from 4 to 30.

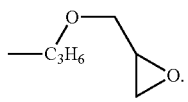

An amount of the used silicon-containing agent (in particualr, oligo- or polysiloxane) is varied within the range from 0.01 to 10 wt. %, preferably from 0.1 to 1 wt. %, more preferably from 0.2 to 0.5 wt. % based on the total amount of monomers. An amount of the added silicon-containing agent is defined by the ratio of an amount of functional groups, in partiuclar epoxide groups, in their formulation and an amount of the initiator used, namely: the twofold excess of epoxide groups of siloxane with respect to the initiator shall be provided.

That is because the portion of functional groups of silicon-containing agent reacts with "living" chains of the (co)polymer, the other portion binds the lithium amide that does not react at the step of producing the initiator, wherein the remaining portion keeps unchanged in the form of functional groups providing the modification of the rubber and improved properties for rubber compositions.

The general scheme of the step of modifying the "living" (co)polymer, using the silicon-containing agent according to the present invention is presented below, but is not limited to it (scheme 1)

Scheme 1. A modifying step, using the silicone-containing agent

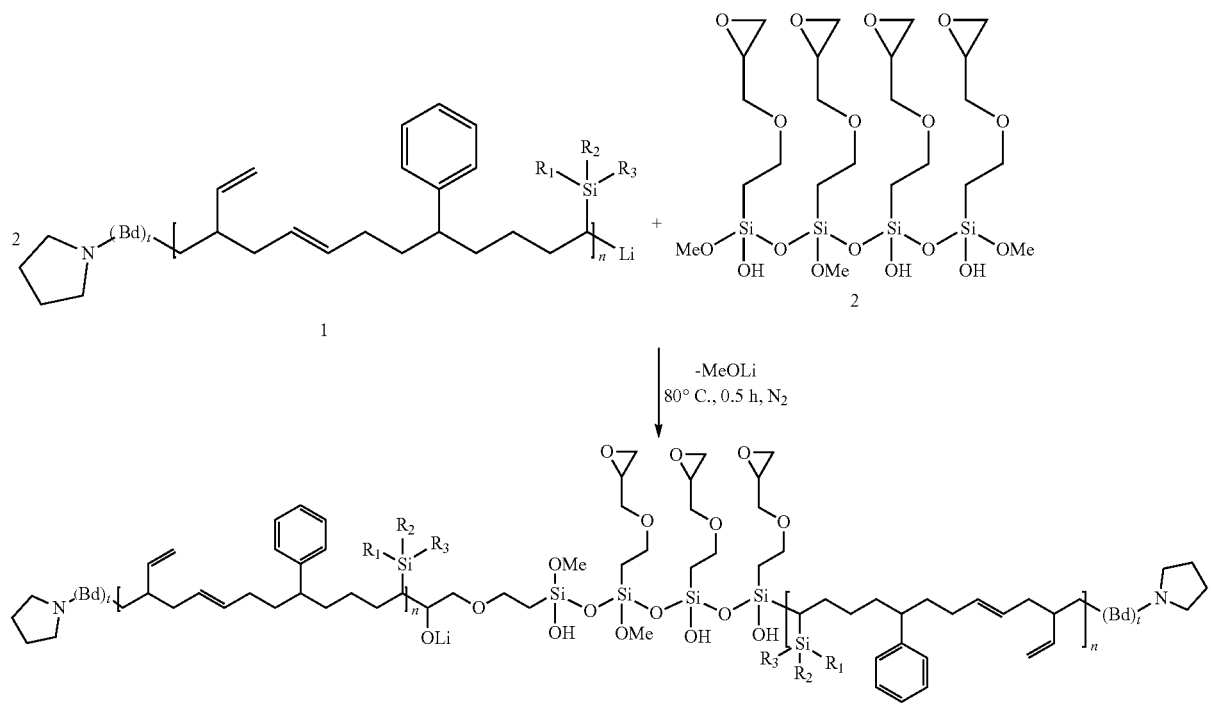

Preferably, the oligo- or polysiloxane has functional epoxy groups comprising C$_{1-20}$alkyl epoxyC$_{1-20}$oxoalkyl or epoxyC$_{1-20}$aryl groups having 1 to 10 epoxide rings in the macromolecule, more preferably the oligo- or polysiloxane has epoxy groups comprising C$_{2-10}$alkyl groups, having 3 to 6 epoxide rings in the macromolecule. Particularly, the epoxy group may represent:

*wherein Bd is butadiene and t is an integer of from 1 to 10

The unbound lithium amide (on the scheme—lithium pyrrolidine) of the step of producing the initiator reacts, as it was described above, with epoxide groups of the silicon-containing agent (scheme 2).

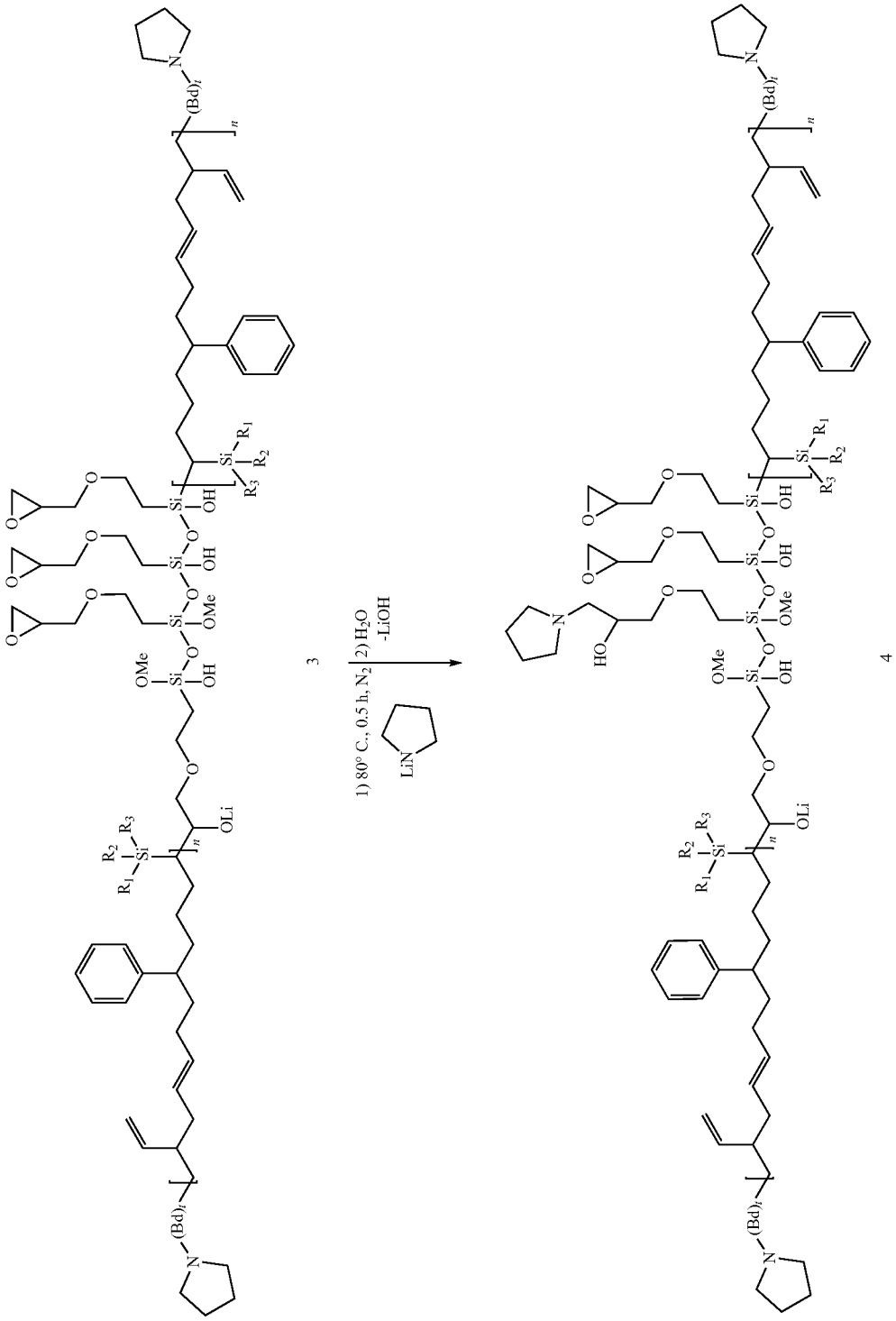
Scheme 2. The unreacted lithium amide reaction with epoxide groups of the (copolymer).

The process of modifying the "living" (co)polymer is carried out at temperature ranging from 20° C. to 120° C., preferably from 50° C. to 100° C., more preferably from 70° C. to 80° C., in an inert atmosphere upon the excess pressure from 0 to 10 atm, preferably from 0.5 to 5 atm, more preferably from 1 to 3 atm, upon the efficient agitation. The temperature mode of the indicated process is defined by the thermal effect of the exothermal modification reaction of the obtained rubber and is selected so as to lower power inputs and the time of conducting the process.

The time of conducting the modification process is varied within the range from 5 to 100 min, preferably from 20 to 60 min, more preferably from 30 to 40 min. The modification time is defined by a degree of branching and functionalization that should be achieved. Rubbers having the functionalization degree from 0 to 100%, preferably from 20 to 80%, more preferably from 30 to 50% and the degree of branching from 100 to 0%, preferably from 80 to 20%, more preferably from 70 to 50%, are obtained as the result of the implementation of the modification. In the context of the present application, the degree of functionalization and degree of branching have values obtained on the basis of the differential curve of the molecular weight distribution of the rubber in case of gel-permeation chromatography.

On completion of the modification process, the obtained polymerizate is mixed with an antioxidant and is subjected to degassing, the obtained rubber is isolated and dried. The rubber may be extended with an oil before degassing, as needed.

Phenolic or amine-type compounds and any other antioxidants known to a skilled person, including mixtures thereof, which are recommended for stabilizing rubbers, may be used as the antioxidants. Examples of phenolic antioxidants are: 2,6-di-tert-butyl-4-methylphenol (ionol, agidol-1, alkophen, antioxidant E321); 2,2-di-(4-methyl-6-tert-butylphenol)methane (antioxidant 2246, Agidol 2, Bisalkophen), 2-methyl-4,6-bis(octylsulfanylmethyl)phenol (IRGANOX 1520 L); pentaerythritol tetrakis(3-3,5-di-tert-butyl-4-hydroxyphenyl)propionate) (IRGANOX 1010); alkyl esters of benzene propanoic acid, $C_{7-9}$ branched alkyl esters of 3,5-bis(1,1-dimethyl-ethyl)-4-hydroxy benzene propanoic acid (IRGANOX 1135); 2,6-di-tert-butyl-4-(4,6-bis(octylthio)-1,3,5-triazin-2-ylamino)phenol (BNX™ 565, Mayzo. Inc); octadecyl-3-(3,5-di-tert-butyl-4-hydroxyphenyl)-propionate (IRGANOX 1076). Examples of amine-type antioxidants are N-isopropyl-N'-phenyl-p-phenylenediamine (IPPD, VULCANOX 4010), N-(1,3-dimethyl-butyl)-N'-phenyl-p-phenylenediamine (Antioxidant 4020, 6PPD), N-(1,3-dimethyl-phenyl)-N'-phenyl-p-phenylenediamine (7PPD), N-2-ethylhexyl-N'-phenyl-n-phenylenediamine (Novantox 8 PFDA, antioxidant C789), N,N'-diphenyl-p-phenylenediamine (DPPD), mixed antioxidants like Santoflex™ 134PD representing the mixture of 1:2 6PPD and 7PPD. The antioxidants are introduced in an amount from 0.2 to 5 wt. % based on the weight of the obtained rubber. Prefeably, the antioxidants are introduced in the amount from 0.3 to 2.5 wt. % based on the total weight of the rubber.

Extender oils for rubbers may be oils relating to TDAE (treated distillate aromatic extract), TRAE (treated residual aromatic extract), MES (mild extracted solvate), naphthene oils (NAP). The use of plant oils, for example rapeseed oil, for extending rubbers is also possible. It is possible to use such types of oils as DAE or RAE (aromatic oils), but it is not desirable because they contain the increased amount of cancergenous substances. The use of a mixture of various oils is also possible. The most typical rubber extender oils are the TDAE oils. Examples of TDAE oils: NORMAN 346 ("Orgkhim", JSC), Vivatec 500 (Hansen&Rosental), Nytex 840 (Nynas). Exampels of MES oils: Vivatec 200 (Hansen&Rosental), Nytex 832 (Nynas), NORMAN 132 ("Orgkhim", JSC). Examples of DAE oils: PN-6 ("Orgkhim", JSC). Examples of NAP oils: Nytex 4700 (Nynas) Octopus N317 (Petroyag, Turkey). Examples of TRAE oils: NORMAN 583 ("Orgkhim", JSC). The extender oil may be fed in an amount of 5 to 80 weight parts per 100 weight parts of the rubber, depending on which technological properties, which should be provided for the obtained rubber. However, mostly the rubber comprising from 25 to 30 wt. % of the oil that corresponds to 34÷44 weight parts of the oil per 100 weight parts of the rubber is obtained.

In accordance with the invention, it is possible to obtain diene-containing rubbers, such as butadiene rubber, butadiene-styrene rubber and butadiene-styrene-isoprene rubber, preferably the butadiene-styrene rubber, having a number-average molecular weight from 50000 to 500000 g/mole, preferably from 100000 to 450000 g/mole, more preferably from 200000 to 400000 g/mole, a polydispersity index from 1 to 3, an amount of 1,2- units ranging between 40 and 100 wt. %, preferably between 50 and 80 wt. %, more preferably between 60 and 70 wt. % based on the polybutadiene portion of the rubber, an amount of vinyl aromatic units from 0 to 50 wt. %, preferably from 10 to 45 wt. %, more preferably from 15 to 40 wt. % based on the total weight of the rubber.

The rubber produced according to the present invention may be used in rubber compositions and vulcanizates based thereon for various applications, providing them with a reduced hysteresis loss under dynamic conditions.

In case of use of the rubbers proposed according to the invention in the formulation of rubber compositions, the efficiency of the interphase contact of the rubber with the polar filler increases, which as a result provides the hysteresis decrease of vulcanizates produced on the basis of such a rubber. Rubber compositions according to the present invention, comprising the obtained rubber, are useful in the manufacture of various components of tires, tire articles, semi-finished products, and other industrial rubber articles. In case of use it for tires, this may be tires, tire articles and semi-finished products used in the manufacture of tires. Thus, for example, the semi-finished products may represent treads, mini-sides, breakers, sidewalls. However, it is the most advantageous to use these rubbers in highly filled with precipitated colloidal silica compositions for the tread of pneumatic and non-pneumatic tires, including vehicle tires, to reduce rolling resistance and, as a consequence, increase in the fuel efficiency of vehicle.

The general requirements to the formulation of rubber compositions are well known to persons skilled in the art.

The rubber compositions proposed according to the present invention differ from the known compositions having the analogous purpose in that they comprise branched-modified rubbers obtained according to the invention.

In accordance with the invention, rubber compositions may be obtained on the basis of: a) A mixture of several rubbers, mainly two or three, selected from the group of butadiene-styrene (A), butadiene (B) and isoprene (C), styrene-butadiene-isoprene (D) or other rubbers, which may be used for the production of rubber compositions of the specific purpose. At the same time, one or more rubbers relating to any of the indicated groups and synthesized in the hydrocarbon solvent medium, using the anionic polymerization process, are obtained according to the invention. In this case, the total content of rubbers in the rubber composition (weight parts per 100 weight parts of the rubber)

without taking into account an extender oil contained therein, is determined according to the equation:

$$A+B+C+D=100 \text{ weight parts,}$$

wherein A, B, C, D—the content of each kind of rubbers, without taking into account the extender oil contained therein (weight parts per 100 weight parts of the rubber) in the rubber composition.

The amount of weight parts per 100 weight parts of the rubber (or phr) means the amount per 100 parts of an elastomer component of the rubber composition, i.e. the total amount of all the presented rubbers and optional other elastomers used in this field, as described below.

At the same time, the total content of rubber(s) obtained according to the invnetion in the rubber composition, without taking into account the extender oil contained therein, should not be less than 30 weight parts, otherwise the efficacy of the improvement in histeresis properties of rubber compositions decreases.

b) One of the rubbers obtained according to the aforesaid method. In this case, the content of the rubber in the rubber composition corresponds to (100+X) weight parts, wherein X is the content of the oil in the rubber (weight parts).

Thus, the total content of rubbers obtained according to the invention in the rubber composition may vary within the range from (30+X) to (100+X) weight parts (X is the content of the oil in the rubber (weight parts)). If the dosage is less than (30+X) weight parts, the necessary effect of the improvement of histeresis properties is not provided. The dosage (100+X) weight parts is maximally possible, based on principles of calculating the rubber formualtions.

The rubber compositions according to the invention may also comprise the following ingredients conventional for tire rubbers and, in particular, tread rubbers (weight parts per 100 weight parts of the rubber):

a) 5-150 weight parts of precipitated colloidal silica;
b) 5-150 weight parts of carbon black;
c) 0.5-30 weight parts of a silanizing agent;
d) a vulcanizing system comprising: sulfur or sulfur donors; accelerants from among sulfenamides, thiurams, thiazoles, guanidines, phosphates and the like, and combinations thereof, used for accelerating the process of the vulcanization of rubber compositions and obtainment of an optimal structure of the vulcanization network; activators are metal oxides, amines and the like, among which the zinc oxide is the most commonly used; prevulcanization retardants among which Santogard PVI is the most commonly used;
e) processing additives improving the dispersion of fillers and processability of rubber compositions;
f) plasticizers, softeners, in particular selected from the group including petrochemical products, plant oils, synthetic ether products, derivative products of the coal-mining industry, synthetic and oligomeric functionalized and non-functionalized products and the like;
g) physical and chemical anti-deteriorants/antiozonants/anti-fatigue agents;
h) other components providing the achievement of the required complex of technological, vulcanization, physical-mechanical and operating characteristics, for example, modifiers; fillers, including fibrous, layered, polymer (such as cross-linked polymer gels) and the like; agents preventing from the reversion upon the vulcanization and increasing the heat stability of rubber compositions; improving adhesive capability and the like.

Butadiene and isoprene rubbers obtained with the use of different catalyst systems (by the polymerization in the solution in the presence of an initiator or polymerization catalyst) and comprising not less than 90 wt. % of 1,4-cis units may be further used in the rubber compositions. Rubber compositions may also comprise a butadiene-styrene copolymer obtained by the emulsion or solution polymerization comprising: from 10 to 50 wt. % of styrene units, the most preferably from 15 to 40 wt. %; from 10 to 90 wt. % 1,2-units based on the polybutadiene portion, the most preferably from 20 to 70 wt. %.

The natural rubber of various producers, kinds and types, for example, RSS (Ribbed Smoked Sheet), IRQPC (according to the International Standards of Quality and Packing of Natural Rubber) may be used for producing rubber compositions, which are the object of the present invention.

In addition to the rubber obtained according to the invention, the rubber composition may also comprise a triple copolymer of styrene, isoprene and butadiene, obtained both by the emulsion and the solution polymerization, with the ratio of styrene:butadiene:isoprene units (wt. %) that is equal to 5-70:20-70:20-70 respectively. At the same time, it is desirable that the total content of vinyl alkyl (1,2-butadiene and 3,4-isoprene) units will be within the range from 20 to 90 wt. % based on the rubber, the most preferably from 40 to 70 wt. %.

It is also possible to use in the rubber composition according to the invention other elastomers and copolymers useful for producing tire rubbers and other rubber based products and compositions, for example, isoprene-butadiene copolymer, polybutadiene having a high content of vinylalkyl (1,2-units), polyisoprene having a high content of 3,4-isoprene units, methods of the obtainment of which are disclosed, for example, in U.S. Pat. No. 4,647,635 A, published on Mar. 3, 1987 and U.S. Pat. No. 4,174,431 A, published on Nov. 13, 1979.

The rubber composition may also comprise oil-extended brands of rubbers, for example, among emulsion and solution butadiene-styrene or butadiene rubbers, methods of the obtainment of which are disclosed, for example, in U.S. Pat. No. 7,915,349 B2, published on Mar. 29, 2011; U.S. Pat. No. 6,800,689 B2, published on Oct. 5, 2009 or U.S. Pat. No. 6,602,942 B1, published on Aug. 5, 2003. At the same time, the content of these rubbers in the in the rubber composition, as a rule, is selected so that the total amount of the rubber and other elastomers in the rubber composition, except for the present additives, corresponds to 100 weight parts.

Each of the presented rubbers that are constituents of the described rubber based products and compositions may have the branched structure, for example, asterial structure of polymer chains. The branching may be provided by different methods (described, for example, in U.S. Pat. No. 4,523,618 A, published on Jun. 18, 1985; U.S. Pat. No. 5,066,721 A, published on Nov. 19, 1991; U.S. Pat. No. 5,422,403 A, published on Jun. 6, 1995; U.S. Pat. No. 5,514,756 A, published on May 7, 1996; U.S. Pat. No. 5,541,264 A, published on Jun. 30, 1996; U.S. Pat. No. 4,575,534 A, published on Mar. 11, 1986), in particular, by the use at the polymerization step of such known branching agents as $SiCl_4$, $SnCl_4$, divinylbenzene and the like.

In accordance with the present invention, the precipitated colloidal silica (colloidal silicon dioxide) or carbon black are used as a reinforcing filler for rubber compositions. At the same time, both these fillers may be used both independently and in combination. It is admissible to use two-phase fillers representing the precipitated colloidal silica coated with the carbon black, and also the precipitated colloidal silica which surface is impregnated with a coupling agent or is chemically modified. The use of the precipitated colloidal silica obtained by pyrogenous method is also possible.

Different kinds of carbon black, such as furnace carbon black of SRF, GPF, FEF, HAF, ISAF, SAF, ISAF-HS, ISAF-LS, IISAF-HS, HAF-HS and HAF-LS kinds; acetylene black; thermal black; impingement black; graphite; carbon fibre; fullerenes and the like, may be indicated as particular examples of the carbon black. The carbon black in which the iodine absorption is at least 60 mg/g and the dibutylphthalate (DBP) absorption is at least 80 ml/100 g, is preferable. The HAF, ISAF and SAF materials that provide the excellent wear resistance are especially preferable. It is possible to use one or more kinds of carbon black in the formulation of the rubber composition. An amount of carbon black may vary between 5 and 150 weight parts per 100 parts of the rubber. When the content of carbon black is within the range of up to 45 weigh parts, this indicates that the precipitated colloidal silica fulfills the function of the main filler. When the content of carbon black is more than 150 weight parts, technological and some operational properties of vulcanizates produced on the basis of such rubber compositions become worse.

An amount of the precipitated colloidal silica presented in the rubber composition is 5-150 weight parts, preferably 10-100 weight parts, and more preferably 30-95 weight parts per 100 weight parts of the rubber. When the content of the precipitated colloidal silica is less than 10 weight parts, then this amount is not sufficient for the necessary improvement of technical characteristics of rubber compositions, but on the other hand when this amount is more than 150 weight parts, technological and some operational properties of vulcanizates produced on the basis of such rubber compositions become worse.

The precipitated colloidal silica, in accordance with the present invention, is characterized by the BET surface ranging from 40-600 $m^2/g$ and the oil absorption (DBP) ranging from 50-400 $cm^3/100$ g. According to the preferable variant, the precipitated colloidal silica has the BET surface of 100-250 $m^2/g$, the CTAB surface of 100-250 $m^2/g$ and the oil absorption (DBP) of 150-250 $cm^3/100$ g (as regards the determination of these measurements, see National State Standard 25699.2-90; EP157703).

Various commercially available types of the precipitated colloidal silica may be useful for these aims, for example, Zeosil 1165MP, Zeosil 1165 GR, Hi-Sil 210, Hi-Sil 243, UltrasilVN2, UltrasilVN3, UltrasilVN3 GR, and also other types of the precipitated colloidal silica used for reinforcing elastomers.

Rubber compositions comprising the precipitated colloidal silica may comprise coupling agents of the precipitated colloidal silica and elastomers. Preferably, the following compounds are used as these coupling agents: bis(3-triethoxysilylpropyl)tetrasulphide, bis(2-triethoxysilylethyl)tetrasulphide, bis(3-trimethoxypropyl)tetrasulphide, bis(2-trimethoxysilylethyl)tetrasulphide, 3-mercaptopropyltrimethoxysilane, 3-mercaptopropyltriethoxysilane, 2-mercaptoethyltrimethoxysilane, 2-mercaptoethyltriethoxysilane, 3-nitropropyltrimethoxysilane, 3-nitropropyltriethoxysilane, 3-chloropropyltrimethoxysilane, 3-chloropropyltriethoxysilane, 2-chloroethyltriethoxysilane, 3-trimethoxysilylpropyl-N,N-dimethylthiocarbamoyl tetrasulphide, 3-trimethoxysilylpropylbenzothiazole tetrasulphide, 3-triethoxysilylpropylmethacrylate monosulphide and the like. The bis(3-triethoxysilylpropyl)tetrasulphide and 3-trimethoxysilylpropylbenzothiazole tetrasulphide are preferable among the aforesaid components.

Furthermore, it is possible to use coupling agents representing mixtures of the aforesaid compounds and other compounds intended for these purposes, with a powder-like carrier, for example, carbon black.

It is admissible to use other coupling agents intended for improving the compatibility of the precipitated colloidal silica and rubber, for example, NXT and NXTZ 100 produced by the company Momentive (USA).

The content of coupling agents in the rubber composition is determined so that an amount of the main active agent, except for the carrier in case of composite coupling agents, with respect to the precipitated silica, will be within the range from 1 to 30 wt. %, more preferably from 5 to 25 wt. %.

The vulcanization of rubber composition is carried out with the use of vulcanizing agents known in the field of the art, for example, an elemental sulfur or sulfur donors, for example N,N'-dimorpholyl disulphide, polymer polysulphides and the like. The elemental sulfur or polymer sulfur are the most widely used in the tire industry. As it is known in this field of the art, the dosing of vulcanizing agents in the rubber composition most often ranges from 0.5 to 4.0 weight parts, sometimes may reach 10 weight parts. By convention, together with sulfur, the following ingredients are used as vulcanization activators, in particular: oxides and hydroxides of alkali earth metals (Zn, Mg, Ca), metals in combination with fatty acids, accelerants (sulfenamides, thiazoles, thiurames, guanidines, urea derivatives and the like) and vulcanization retardants (phthalic anhydride, N-nitrosodiphenylamine, cyclohexylthiophthalimide). Their content depends upon the amount of the vulcanizing agent and requirements to the vulcanization kinetics and structure of vulcanization network.

Rubber compositions filled with the precipitated colloidal silica, as a rule, also comprise technological additives improving the dispersion of fillers and processability of the rubber compositions. Preferably, additives comprise fatty acid derivatives (zinc salts and alkyl esters, and also mixtures of these compounds), which improve the dispersion of fillers and reduce the viscosity of the mixture. Products comprising fatty acid derivatives, which are known under trademarks Struktol E44, Struktol GTI and Actiplast ST, may be indicated as the example.

Plasticizers and softeners, in particular selected from the group including petrochemical products, plant oils, synthetic ether products, derivative products of the coal-mining industry, synthetic and oligomeric functionalized and non-functionalized products and the like, may also be components of the rubber compositions, as described, for example, in Rubber Technologist's Handbook, Volume 2, Capert: Rubber Additives—Plasticisers and softeners/J. R. White, S. K. De, 2001-pp 198-200.

The rubber compositions for tires, as a rule, comprise ingredients of the following purpose: anti-deteriorants, antiozonants, anti-fatigue agents and other components providing the achievement of the required complex of technological, vulcanization, physical-mechanical and operating characteristics, for example: modifiers; fillers, including fibrous, layered, polymer (such as cross-linked polymer gels) and the like; agents preventing from the reversion upon the vulcanization and increasing the heat stability of vulcanizates; adhesiveness intensifiers and the like. The nature of these compounds and their content in the rubber composition depend upon the required level of properties of rubber compositions and vulcanizates and are well known to persons skilled in the art (Rubber Technologist's Handbook, Volume 1, Capert: Rubber Additives—Compounding Ingredients/R. N. Datta and F. A. A. Ingham).

The rubber compositions are obtained by methods known in this field of the art, which are disclosed, for example, in [Jon S. Dick, Rubber Technology. Compounding and Testing for Performance.Carpet: Mixing], preferably with the use of internal rubber mixers, for example, like Banbury or Intermix. The process of mixing may comprise two or three steps, wherein the second step or third step is intended for adding components of a vulcanizing group into the mixture. The vulcanization temperature is 130-180° C., preferably 140-170° C.

Vulcanizates prepared from rubber compositions comprising rubbers obtained according to the present invention are characterized by the improved complex of elastic-hysteresis characteristics, namely the reduced hysteresis loss, assessed at the temperature of 60° C. and good stress-strain properties under tension.

EMBODIMENT OF THE INVENTION

The preliminary obtaining of the functionalizing initiator (Pir-(Bd)$_r$-Li) (on example of pyrrolidine butadiene lithium)

A process of producing the functionalizing lithium initiator Pir-(Bd)$_r$-Li is carried out in the reactor of the firm "Buchi" with a glass cup having the useful capacity of 0.5 L supplied with the mixer, thermostating jacket, connection pipes and special removable metal dispensers for feeding reagents.

Toluene (309 ml), THF (15.531 g) and pyrrolidine (9.9554 g) are fed to the reactor in the nitrogen stream and 2.5 M solution of n-butyl lithium in hexane (56 ml) is fed upon mixing (300 rpm), as a result of which a temperature of the reaction mass rises from 20° C. to 42° C., then the reaction mass is thermostated at 50° C. and butadiene (15.146 g) is fed, the mixing (300 rpm) is continued for one hour at temperature of 50-60° C. Thereafter, the THF is distilled under vacuum. The distillation is continued until the refractive index of the distilled liquid will be equal to the refractive index of styrene, namely 1.4969 at the temperature of 20° C. The remaining initiator solution is titrated by the solution of isopropanol in toluene, as a result of which the concentration of initiator equal to 0.32 mole/l is reached. The obtained initiator is used in reactor syntheses: Molecular weight characteristics of the obtained initiator are presented below.

| Number-average molecular weight $M_n$ | Weight-average molecular weight $M_w$ | Density PD | Average molecular weight $M_z$ |
| --- | --- | --- | --- |
| 705 | 758 | 1.08 | 816 |

Example 1. Polymerization with the Use of the Preliminary Obtained Functionalizing Lithium Initiator Pir-(Bd)$_r$-Li, the Polar Comonomer—bis(dimethylamino)vinylmethylsilane (BDAS) and the Polyfunctional Silicon-Containing Agent—Coatosil MP 200

The process of producing butadiene-styrene rubbers is carried out in the reactor of the firm "Buchi" with a metal cup having the useful capacity of 2 L supplied with the mixer, thermostating jacket, connection pipes and special removable metal dispensers for feeding reagents.

Petroleum solvent (984 g), butadiene (92.62 g), styrene (33.57 g) and 1 M of the BDAS solution in the petroleum solvent (0.32 ml) and 2.0 ml of the DTHFP solution in the petroleum solvent (0.32 M solution) are fed to the reactor cooled to (−20) ° C. (±2° C.) in the nitrogen stream at the mixer rotation speed of 50 rpm. Thereafter the rotation speed of the mixer equal to 300 rpm is fixed, after which the temperature of the reaction mass is increased up to 55° C. with the heating rate of 7 K/min; when the temperature amounts to 55° C., 3.9 ml of the initiator solution (0.32 M solution) is fed. When the required conversion degree of monomers (100%) is reached, the portion of the polymer is taken away for the analysis of microstructural and molecular properties of the rubber. Then the reaction mass is heated up to 80° C. and the polyfunctional silicon-containing agent—Coatosil MP 200 is fed in an amount of 0.2 wt. % based on the rubber. The modification process is carried out at the temperature 80° C. for 30 minutes. After this, a polymerizate is poured out to a beaker and is filled with the antioxidant Novantox (0.4 wt. % based on the polymer). Then the aqueous degassing of the rubber is carried out in the oil bath at the temperature of 150° C. The obtained rubber containing water is dried on rolls at the temperature of 85° C.

Properties of the obtained rubber are presented in Table 1.

Example 2. Polymerization with the Use of the Preliminary Obtained Functionalizing Lithium Initiator Pir-(Bd)$_r$-Li, the Polar Comonomer—BDAS and the Polyfunctional Silicon-Containing Agent—Coatosil MP 200

The process of producing butadiene-styrene rubbers is carried out according to the procedure described in example 1, except that 0.64 ml of 1M BDAS solution in the petroleum solvent is used (the amount of the polar comonomer—the BDAS—is two times greater).

Properties of the obtained rubber are presented in Table 1.

Example 3. Polymerization with the Use of Functionalizing Lithium Initiator Pyrrolidine+BuLi Obtained in the Reaction Mixture, the Polar Comonomer—BDAS and the Polyfunctional Silicon-Containing Agent—Coatosil MP 200

The process of producing butadiene-styrene rubbers is carried out in the reactor of the firm "Buchi" with a metal cup having the useful capacity of 2 L supplied with the mixer, thermostating jacket, connection pipes and special removable metal dispensers for feeding reagents.

Petroleum solvent (987 g), butadiene (91.92 g), styrene (35.75 g) and 4.0 ml of the DTHFP solution in the petroleum solvent (0.32 M solution), 1 M of the BDAS solution in the petroleum solvent (0.62 ml) and a pyrrolidine solution in the petroleum solvent (5.9 ml, 0.2 M) are fed to the reactor cooled to (−20) ° C. (±2° C.) in the nitrogen stream at the mixer rotation speed of 50 rpm. Thereafter the rotation speed of the mixer equal to 300 rpm is fixed, after which the temperature of the reaction mass is increased up to 55° C. with the heating rate of 7 K/min; when the temperature amounts to 55° C., 4.0 ml of the n-butyl lithium solution in the petroleum solvent (0.32 M solution) is fed. When the required conversion degree of monomers (100%) is reached, the portion of the polymer is taken away for the analysis of microstructural and molecular properties of the rubber. Then the reaction mass is heated up to 80° C. and the polyfunctional silicon-containing agent—Coatosil MP 200 is fed in an amount of 0.3 wt. % based on the rubber. The modification process is carried out at the temperature of 80° C. for 30 minutes. After this, a polymerizate is poured out to a beaker and is filled with the antioxidant Novantox (0.4 wt. % based on the polymer). Then the aqueous degassing of the rubber is carried out in the oil bath at the temperature of 150°

C. The obtained rubber containing water is dried on rolls at the temperature of 85° C.

Properties of the obtained rubber are presented in Table 1.

Example 4. Polymerization with the Use of the Preliminary Obtained Functionalizing Lithium Initiator Pir-(Bd)$_t$-Li, the Polar Comonomer—BDAS and the Polyfunctional Silicon-Containing Agent—Coatosil MP 200

The process of producing butadiene-styrene rubbers is carried out according to the procedure described in example 1, except that 0.64 ml of 1M BDAS solution (the amount of the polar comonomer—the BDAS—is two times greater) and 0.3 wt. % based on the total amount of monomers of the polyfunctional silicon-containing agent—Coatosil MP200 (half as much again) are used.

Properties of the obtained rubber are presented in Table 1.

Example 5. Polymerization with the Use of the Functionalizing Lithium Initiator Pyrrolidine+BuLi Obtained in the Reaction Mixture, the Polar Comonomer—BDAS and the Polyfunctional Silicon-Containing Agent—Coatosil MP 200

The process of producing butadiene-styrene rubbers is carried out according to the procedure described in example 3, except that 0.64 ml of 1M BDAS solution in the petroleum solvent is used (the amount of the polar comonomer—the BDAS—is two times greater).

Properties of the obtained rubber are presented in Table 1.

Example 6. Polymerization with the Use of the Preliminary Obtained Functionalizing Lithium Initiator Pir-(Bd)$_t$-Li, the Polar Comonomer—BDAS and the Polyfunctional Silicon-Containing Agent—Coatosil MP 200

The process of producing butadiene-styrene rubbers is carried out according to the procedure described in example 1, except that 1.28 ml of 1M BDAS solution in the petroleum solvent (the amount of the polar comonomer—the BDAS—is four times greater) and 0.3 wt. % based on the total amount of monomers of the polyfunctional silicon-containing agent—Coatosil MP200 (1,5 times greater) are used.

Properties of the obtained rubber are presented in Table 1.

Example 7. Polymerization with the Use of the Preliminary Obtained Functionalizing Lithium Initiator Pir-(Bd)$_t$-Li and the Polyfunctional Silicon-Containing Agent—Coatosil MP 200

The process of producing butadiene-styrene rubbers is carried out according to the procedure described in example 1, except that 0.3 wt. % of the polyfunctional silicon-containing agent Coatosil MP200 based on the total amount of monomers (1.5 times greater) is used, and that the polar comonomer is not used.

Properties of the obtained rubber are presented in Table 1.

Example 8. Polymerization with the Use of the Functionalizing Lithium Initiator Pyrrolidine+BuLi Obtained in the Reaction Mixture and the Polyfunctional Silicon-Containing Agent—Coatosil MP 200

The process of producing butadiene-styrene rubbers is carried out according to the procedure described in example 3, except that the polar comonomer is not used.

Properties of the obtained rubber are presented in Table 1.

Example 9. Polymerization in the Presence of n-butyl Lithium (Comparative)

The process of producing butadiene-styrene rubbers is carried out in the reactor of the firm "Buchi" with a metal cup having the useful capacity of 2 L supplied with the mixer, thermostating jacket, connection pipes and special removable metal dispensers for feeding reagents.

Petroleum solvent (990 g), butadiene (93.00 g), styrene (31.00 g) and 1.65 ml of the DTHFP solution in the petroleum solvent (0.32 M solution) are fed to the reactor cooled to (−20) ° C. (±2° C.) in the nitrogen stream at the mixer rotation speed of 50 rpm. Thereafter the rotation speed of the mixer equal to 300 rpm is fixed, after which the temperature of the reaction mass is increased up to 55° C. with the heating rate of 7 K/min; when the temperature amounts to 55° C., 3.3 ml of the n-butyl lithium solution in petroleum solvent (0.32 M solution) is fed. When the required conversion degree of monomers (100%) is reached, the polymer is poured out to the beaker and is filled with the antioxidant Novantox (0.4 wt. % based on the polymer). Then the aqueous degassing of the rubber is carried out in the oil bath at the temperature of 150° C. The obtained rubber containing water is dried on rolls at the temperature of 85° C.

Properties of the obtained rubber are presented in Table 1.

Example 10. Commercially Available Rubber

Properties of the commercially available rubber that is branched and functionalized are presented in Table 1.

TABLE 1

Properties of rubbers described in examples 1-12

| Example No | A process of producing the initiator | Initiator | DTHFP/ Initiator ratio | BDAS, % wt. % per rubber | Coatosil, wt. % per rubber | NMR 1H St, wt. % | 1,2-Bd*, wt. % | MWD $M_n \times 10^{-3}$, g/mole | $M_w/M_n$ | $M_z \times 10^{-3}$, g/mole | Mooney viscosity |
|---|---|---|---|---|---|---|---|---|---|---|---|
| 1 | Preliminary | Pir-(Bd)$_t$-Li | 1/2 | 0.04 | 0.2 | 26.35 | 59.80 | 130 | 1.33 | 228 | — |
|  |  |  |  |  |  | 26.40 | 59.89 | 170 | 1.96 | 551 | 57 |
| 2 | Preliminary | Pir-(Bd)$_t$-Li | 1/2 | 0.08 | 0.2 | 26.70 | 60.10 | 129 | 1.32 | 221 | — |
|  |  |  |  |  |  | 26.74 | 60.16 | 145 | 2.16 | 571 | 57 |
| 3 | In the reaction mixture (in situ) | Pyrrolidine + BuLi | 1/2 | 0.08 | 0.3 | 26.88 | 58.15 | 149 | 1.43 | 308 | — |
|  |  |  |  |  |  | 26.91 | 58.08 | 196 | 1.87 | 575 | 61 |
| 4 | Preliminary | Pir-(Bd)$_t$-Li | 1/2 | 0.08 | 0.3 | 28.09 | 59.13 | 167 | 1.68 | 485 | — |
|  |  |  |  |  |  | 28.01 | 59.01 | 167 | 1.91 | 621 | 60 |
| 5 | In the reaction mixture (in situ) | Pyrrolidine + BuLi | 1/2 | 0.16 | 0.3 | 28.41 | 57.25 | 145 | 1.72 | 452 | — |
|  |  |  |  |  |  | 28.35 | 57.17 | 153 | 1.97 | 577 | 62 |
| 6 | Preliminary | Pir-(Bd)$_t$-Li | 1/2 | 0.16 | 0.3 | 26.75 | 59.12 | 131 | 1.34 | 257 | — |
|  |  |  |  |  |  | 26.69 | 59.02 | 185 | 1.85 | 527 | 60 |
| 7 | Preliminary | Pir-(Bd)$_t$-Li | 1/2 | — | 0.3 | 27.92 | 57.71 | 150 | 1.33 | 264 | — |
|  |  |  |  |  |  | 27.94 | 57.79 | 195 | 1.84 | 558 | 58 |
| 8 | In the reaction mixture (in situ) | Pyrrolidine + BuLi | 1/2 | — | 0.3 | 27.61 | 56.41 | 128 | 1.37 | 222 | — |
|  |  |  |  |  |  | 27.66 | 56.35 | 189 | 1.79 | 500 | 69 |

TABLE 1-continued

Properties of rubbers described in examples 1-12

| Example No | A process of producing the initiator | Initiator | DTHFP/ Initiator ratio | BDAS, % wt. % per rubber | Coatosil, wt. % per rubber | NMR 1H St, wt. % | NMR 1H 1,2-Bd*, wt. % | MWD $M_n \times 10^{-3}$, g/mole | MWD $M_w/M_n$ | MWD $M_z \times 10^{-3}$, g/mole | Mooney viscosity |
|---|---|---|---|---|---|---|---|---|---|---|---|
| 9 | — | BuLi | 1/2 | — | — | 26.44 | 60.20 | 180 | 1.21 | 263 | 49 |
| 10 | no data about conditions of the synthesis and modification | | | | | 19.30 | 63.30 | 133 | 1.80 | 432 | 58 |

*based on the butadiene portion of the polymer
Pir-(Bd)t-Li—functionalizing lithium initiator preliminary obtained
Pyrrolidine + BuLi—functionalizing lithium initiator obtained in the reaction mixture
BDAS—bis(dimethylamino)vinylmethylsilane
Coatosil—polyfunctional end modifier- oligosiloxane.

Example 11. Tests of the Rubbers Described in Examples 1-10 in the Formulations of Rubber Compositions The tests of the rubbers described in examples 1-8 and comparative samples (examples 9-10) were carried out in the rubber composition for passenger-car tire tread. The recipe of the rubber composition is presented in Table 2. The manufacture of the rubber compositions was carried out using the plasticorder Plastograph ECPlus, Model 2008 of the firm "Brabender" (Germany). The free volume of the mixing chamber with N 50 EHT type cam rotors was 80 cm³. The mixing was carried out in three steps: the 1$^{st}$ step—mixing all ingredients except for the vulcanizing group, i.e. sulfur, MBT, DPG, SAC); the initial temperature of chamber walls is 130° C., the maximal temperature in the chamber during the mixing process—not more than 160° C., the rotation speed of rotors is 40-60 rpm; the 2$^{nd}$ step—dispersing mixing the mixture of the step 1 without the addition of further ingredients; the initial temperature of chamber walls is 80° C., the maximal temperature—not more than 130° C., the rotation speed of rotors is 60 rpm; the 3$^{rd}$ step—administering the vulcanizing group to the rubber composition; the initial temperature of chamber walls is 80° C., the maximal temperature—not more than 110° C., the rotation speed of rotors is 40 rpm.

TABLE 2

Formulation of the rubber compositions

| Names of ingredients | Content, weight parts per 100 weight parts of the rubber |
|---|---|
| Natural rubber TSR RSS-1 | 30.0 |
| Solution butadiene-styrene rubber according to examples 1-9 | 70.0 |
| Carbon black N 339 (Yaroslavskiy factory of carbon black) | 13.0 |
| Precipitated colloidal silica Zeosil 1165 MP (Solvay) | 86.0 |
| Plasticizer Vivatec 200 (Hansen&Rosental) | 50.0 |
| Plasticizer rapeseed oil (technical) ("Profet", LLC) | 8.0 |
| Antiageing retardant 6PPD (EastmanSantoflex) | 2.5 |
| Antiageing retardant TMQ (Chemtura) | 2.0 |
| Protective wax Antilux 111 (RheinChemie) | 2.0 |
| Zinc oxide (Empils, LLC) | 2.0 |
| Stearic acid ("Nefis Cosmetics", JSC) | 1.0 |
| Technological additive ActiplastST (RheinChemie) | 4.0 |
| Silanizing agent Si-69 (Evonic) | 8.0 |
| Mercaptobenzothiazole (MBT-2) (Stair, China) | 0.1 |
| Diphenylguanidine (DPG) (RheinChemie) | 2.0 |
| Sulfenamide C (SAC) (Lanxess) | 2.0 |
| Milled sulfur, technical 9998 (Oil company Lukoil) | 1.7 |

The preparation of rubber compositions for vulcanization, the vulcanization and preparation of samples for tests were carried out in accordance with ASTM D 3182. Modes of vulcanization: 160° C. for 20 min to assess the deformation-strength properties and for 30 min to assess the hardness and abradability. The assessment of the main properties of vulcanizates upon tension ($f_{300}$-the conventional stress upon the 300% elongation, $f_r$-modulus of rupture, $\varepsilon_{rel}$-breaking elongation) was carried out according to ASTM D 412-98, of Shore D hardness (H)—according to National State Standard 263-75. The Shopper-Schlobach abradability (ABR) (method B) was assessed in accordance with National State Standard 23509-79. Hysteresis properties (tgδ-mechanical loss tangent) were determined with the use of DMA 242 C apparatus (NETZSCH) and RPA-2000 apparatus (Alpha Technology). Conditions of tests on the DMA 242 C: two arm bend, sizes of the sample—10.00× 6.50×2.0 mm, amplitude −40 μm (1%), frequency—10 Hz, load—7 N. The temperature range for the test is from (−60) ° C. to (+60) ° C., the temperature increase rate is 2°/min. Conditions of tests on the RPA-2000: shift, amplitude—10%, frequency—10 Hz, the temperature is 60° C.

Vulcanizing characteristics: $t_{s1}$—the starting time of vulcanization, $t_{50}$—time to 50% vulcanization degree, $t_{90}$—optimal time of vulcanization, $M_H$—maximum torque, $M_L$—minimum torque, were assessed with the use of RPA 2000 apparatus at 160° C. for 30 min and frequency 1.7 Hz, in accordance with ASTM D 5289-07.

Table 3 comprises vulcanizing, physical-mechanical and hysteresis properties of rubber compositions and vulcanizates comprising rubbers described in examples 1-10.

TABLE 3

Properties of rubber compositions and vulcanizates

| Index | Sample 1 Pir-(Bd)$_r$-Li; BDAS-0.04; Coatosil 0.2 | Sample 2 Pir-(Bd)$_r$-Li; BDAS-0.08; Coatosil 0.2 | Sample 3 Pir-Li (in situ); BDAS 0.08; Coatosil 0.3 | Sample 4 Pir-(Bd)$_r$-Li; BDAS 0.08; Coatosil 0.3 | Sample 5 Pir-Li (in situ); BDAS 0.16; Coatosil 0.3 | Sample 6 Pir-(Bd)$_r$-Li; BDAS 0.16; Coatosil 0.3 | Sample 7 Pir-(Bd)$_r$-Li; Coatosil 0.3 | Sample 8 Pir-Li (in situ); Coatosil 0.3 | Sample 9 Non-functionalized rubber | Sample 10 Commercially available rubber |
|---|---|---|---|---|---|---|---|---|---|---|
| *Vulcanizing characteristics (RPA-2000, 160° C. × 30 min)* | | | | | | | | | | |
| $t_{s1}$, min | 1.7 | 1.7 | 1.9 | 1.9 | 1.5 | 1.6 | 1.5 | 1.6 | 1.8 | 1.9 |
| $t_{10}$, min | 1.9 | 1.9 | 2.3 | 2.2 | 1.7 | 1.7 | 1.8 | 1.8 | 2.0 | 2.2 |
| $t_{50}$, min | 3.4 | 3.5 | 3.5 | 3.4 | 2.8 | 3.3 | 2.9 | 3.0 | 3.1 | 3.4 |
| $t_{90}$, min | 15.8 | 15.9 | 15.9 | 16.0 | 14.8 | 15.0 | 9.7 | 10.2 | 7.9 | 11.4 |
| $M_H - M_L$, dNm | 17.0 | 16.4 | 16.9 | 17.3 | 16.7 | 17.2 | 17.5 | 17.0 | 15.5 | 15.8 |
| *Physical and mechanical properties of vulcanizates* | | | | | | | | | | |
| $f_{300}$, MPa | 11.4 | 12.0 | 11.5 | 11.1 | 12.0 | 11.8 | 11.4 | 11.2 | 8.6 | 10.4 |
| $f_r$, MPa | 17.4 | 17.5 | 17.6 | 17.5 | 17.7 | 17.6 | 17.1 | 17.0 | 15.3 | 16.2 |
| $E_{rel}$, % | 430 | 410 | 460 | 470 | 450 | 430 | 430 | 450 | 500 | 470 |
| H, Shore A | 59 | 57 | 59 | 59 | 60 | 61 | 62 | 60 | 62 | 60 |
| ABR, mm$^3$ | 170 | 172 | 173 | 167 | 179 | 181 | 169 | 169 | 184 | 173 |
| *Hysteresis properties* | | | | | | | | | | |
| tgδ (0° C.)* | 0.417 | 0.467 | 0.453 | 0.419 | 0.419 | 0.430 | 0.401 | 0.369 | 0.349 | 0.366 |
| tgδ (60° C.)* | 0.164 | 0.148 | 0.139 | 0.140 | 0.140 | 0.130 | 0.155 | 0.154 | 0.194 | 0.162 |
| tgδ (60° C.)** | 0.125 | 0.122 | 0.118 | 0.117 | 0.123 | 0.122 | 0.144 | 0.148 | 0.148 | 0.133 |
| *Alteration in hysteresis properties (in %) with respect to example 9\*\*\** | | | | | | | | | | |
| tgδ (0° C.)* | 119 | 130 | 134 | 120 | 120 | 123 | 115 | 106 | 100 | 105 |
| tgδ (60° C.)* | 115 | 124 | 128 | 128 | 128 | 133 | 120 | 121 | 100 | 116 |
| tgδ (60° C.)** | 116 | 118 | 120 | 121 | 117 | 118 | 103 | 100 | 100 | 110 |
| ABR, mm$^3$ | 108 | 107 | 106 | 109 | 103 | 104 | 108 | 108 | 100 | 106 |

Comments:
*DMA 242 C (1%, 10 Hz);
**RPA-2000 (10%, 10 Hz, shift);
***values greater than 100 show the improvement of the index, less than 100 - worsening.
Pir-Li—functionalizing lithium initiator obtained in the reaction mixture
Pir-(Bd)$_r$-Li—functionalizing lithium initiator preliminary obtained
BDAS—bis(dimethylamino)vinylmethylsilane,
Coatosil 0.3—polyfunctional end modifier - oligosiloxane.
$t_{s1}$—the starting time of vulcanization,
$t_{50}$—time to 50% vulcanization degree,
$t_{90}$—optimal time of vulcanization,
$M_H$—maximum torque,
$M_L$—minimum torque,
$f_{300}$—the conventional stress upon the 300% elongation,
$f_r$—modulus of rupture,
$\varepsilon_{rel}$—breaking elongation,
H, Shore—Shore hardness,
ABR—Shopper-Schlobach abradability,
tgδ—mechanical loss tangent.

It is an object of the present invention to create rubbers capable of improving hysteresis properties of rubber compositions and vulcanizates comprising them, namely lower hysteresis loss at 60° C. and increase them at 0° C.

The hysteresis loss was assessed according to the mechanical loss tangent (tgδ) at temperatures—0° C. and 60° C. and strain amplitudes—1 and 10%.

The hysteresis properties determined at the temperature of 60° C. in case of tire tread rubbers characterize the rolling loss and, as a consequence, the economy of fuel of the automobile in the whole. Otherwise, for example, for industrial rubber articles of different purpose, this index may indicate the hysteresis loss level in the vulcanizates under dynamic operating conditions.

The index tgδ at temperature 0° C. is of interest for tread rubbers and characterizes their road grip properties. The improvement of road grip properties of the tread is observed upon the increased levels of tgδ at 0° C.

Rubbers obtained according to the invention (examples 1-6), due to the functionalization at the beginning of chain, using the functionalizing initiator, the modification at the end of chain, using the silicon-containing agent and the functionalization along the chain by means of inclusion of the polar comonomer, increase in the affinity and interaction between the rubber and filler, due to which vulcanizates comprising the rubbers according to examples 1-6 have 19-34% better tgδ at 0° C. in comparison with the vulcanizates comprising non-modified rubber (example 9) and 4-15% better tgδ at 0° C. in comparison with vulcanizates comprising rubbers with double functionalization at the beginning and at the end of chain (examples 7, 8) and 13-27% better tgδ at 0° C. in comparison with the commercially available rubber (example 10)(Table 3).

It follows from data of Table 3 that, in accordance with the invention, the simultaneous use for the rubber modification of the functionalized comonomer (BDAS) providing the functionalization along a polymer chain, the functionalizing initiator that is preliminary obtained or is obtained in the reaction mixture (according to the examples under the consideration, the functionalizing initiator is obtained upon the reaction of pyrrolidine with butyl lithium and butadiene) which provides the functionalization of the polymer chain at the beginning thereof, and a polyfunctional end modifier—oligosiloxane (according to the examples under consideration—this is Coatosil MP 200), providing the branching—modification at the ends of chains, results in lowering values of the index tg at 60° C. of the vulcanizates. Thus, the rubbers obtained according to the invention (examples 1-6) provide lowering the hysteresis loss of vulcanizates at 60° C., assessed upon 1% and/or 10% amplitude of the dynamic deformation, as compared to the unmodified rubber (example 9) by 15-33%, as compared to the rubbers with double functionalization at the beginning and at the end of chain (examples 7, 8)—by 8-20%.

Thus, the proposed approach to the modification provides the necessary set of functional groups in the rubber, which has the greater advantageous influence on the compatibility of the rubber and filler in a rubber composition and, as a consequence, results in the significant lowering of hysteresis loss at 60° C. of vulcanizates produced on the basis of such rubber composition.

As regards the influence on the abradability of rubber compositions, the rubbers obtained according to the invention are at the level of comparison samples described in examples 7, 8, 10 and surpass the unmodified rubber (example 9).

The observed changes of vulcanizing properties of rubber compositions and deformation-strength properties of vulcanizates (see Table 3) do not limit the possibility of using the rubbers obtained in accordance with the invention according to the specific purpose, but should be taken by the skilled person into account upon the development of formulations of the rubber compositions comprising them.

The invention claimed is:

1. A method of producing a rubber, comprising:
   a) (co)polymerizing:
      at least one diene monomer,
      optionally at least one vinylaromatic monomer, and
      a vinyl-silicone compound,
      in the presence of a functionalizing lithium initiator, and
   b) modifying the obtained (co)polymer by a polyfunctional silicon-containing agent,
   wherein the functionalizing lithium initiator is obtained by reacting an organolithium compound, a secondary amine and a diene-containing compound.

2. The method according to claim 1, wherein the (co)polymerization is an anionic (co)polymerization in solvent.

3. The method according to claim 1, wherein the diene monomer is selected from the group consisting of conjugated dienes having from 4 to 12 carbon atoms.

4. The method according to claim 1, wherein the vinylaromatic monomer is a compound selected from the group consisting of: styrene, α-methylstyrene, ortho-, meta- and para-methylstyrene, 3-vinyl toluene, ethylvinyl benzene, 4-cyclohexyl styrene, para-tert-butyl styrene, methoxy styrene, vinyl mesitylene, divinyl benzene, and 1-vinyl naphthalene.

5. The method according to claim 1, wherein the functionalizing lithium initiator is obtained in situ in the reaction mixture of step a), wherein the diene-containing compound is a diene monomer of the step (a) of the (co)polymerization.

6. The method according to claim 1, wherein the vinyl-silicon compound is a compound represented by the general formula (I):

wherein $R_1$ and $R_2$ are the same or different and represent optionally substituted $C_{1-20}$alkyl, $C_{2-20}$alkenyl, $C_{3-20}$cycloalkyl, $C_{6-20}$aryl, $C_{5-20}$heterocyclyl, $C_{5-20}$heteroaryl, or $NR_6R_7$, or $R_1$ and $R_2$ in combination with each other form a 3- to 8-membered saturated or unsaturated ring consisting of carbon atoms and, optionally, of 1 to 3 atoms selected from an oxygen atom, a sulfur atom and a nitrogen atom;
$R_3$ represents $NR_6R_7$, wherein $R_6$ and $R_7$, are the same or different and represent optionally substituted $C_{1-8}$alkyl, $C_{2-8}$alkenyl, $C_{3-8}$cycloalkyl, $C_{6-10}$aryl, $C_{5-10}$heterocyclyl, $C_{5-10}$heteroaryl.

7. The method according to claim 6, wherein $R_1$ and $R_2$ in the compound of formula (I) independently represent $C_{1-20}$alkyl or $C_{2-20}$alkenyl, or $C_{6-10}$aryl or $NR_6R_7$, wherein said groups $C_{1-20}$alkyl, $C_{2-20}$alkenyl, $C_{6-10}$aryl, and $NR_6R_7$ are optionally substituted with 1 to 3 substituents selected from a halogen and $C_{1-6}$alkoxy.

8. The method according to claim 7, wherein $R_1$ and $R_2$ in the compound of formula (I) independently represent $C_{1-20}$alkyl.

9. The method according to claim 6, wherein when $R_1$ or $R_2$ represent $NR_6R_7$, $R_6$ and $R_7$ independently represent $C_{1-20}$alkyl or $C_{6-20}$ aryl, wherein said $NR_6R_7$, $C_{1-20}$alkyl, and $C_{6-20}$ aryl are optionally substituted with 1 to 3 substituents selected from a halogen and $C_{1-6}$alkoxy.

10. The method according to claim 6, wherein the vinyl-silicon compound is vinyl($C_{1-20}$)alkyl-di(($C_{1-20}$)alkylamino)silane, vinyl-di($C_{1-20}$)alkyl-(($C_{1-20}$)alkylamino)silane or vinyl-tris(($C_{1-20}$)alkylamino)silane.

11. The method according to claim 6, wherein the vinyl-silicon compound is a compound selected from vinyl(dimethylamino)dimethylsilane, bis(dimethylamino)vinylmethylsilane, vinyl-tris(dimethylamino)silane, vinyl (dimethylamino)diethylsilane, bis(dimethylamino) vinylethylsilane, vinyl(diethylamino)dimethylsilane, bis (diethylamino)vinylmethylsilane, vinyl-tris(diethylamino) silane, vinyl(diethylamino)diethylsilane, bis(diethylamino) vinylethylsilane, vinyl(dimethylamino)diphenylsilane, bis (dimethylamino)vinylphenylsilane, vinyl(diphenylamino) dimethylsilane, bis(diphenylamino)vinylmethylsilane, and vinyl-tris(diphenylamino)silane.

12. The method according to any one of claims 1 to 11, wherein an amount of the vinyl-silicon compound is from 0.001 to 10 wt. %.

13. The method according to claim 1, wherein the initiator is preliminary obtained or is obtained in situ in the reaction mixture by reacting an organolithium compound, a secondary amine and diene in equimolar amount in the presence of an electron-donor additive and a solvent.

14. The method according to claim 1, wherein the organolithium compound is $C_{1-20}$ alkyllithium, $C_{6-10}$aryllithium, $C_{2-20}$alkenyllithium, $C_{2-20}$alkylenedilithium, $C_{2-20}$alkenylenedilithium compounds.

15. The method according to claim 1, wherein the secondary amine is a compound of the general formula (II):

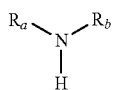
(II)

wherein $R_a$ and $R_b$ independently represent optionally substituted $C_{1-20}$alkyl, $C_{2-20}$alkenyl, $C_{3-20}$cycloalkyl, $C_{6-20}$aryl, $C_{5-20}$heterocyclyl, $C_{5-20}$heteroaryl, or $R_a$ and $R_b$ in combination with each other form a 3- to 20-membered saturated or unsaturated ring consisting of carbon atoms and, optionally, of 1 to 3 atoms selected from an oxygen atom, a sulfur atom and a nitrogen atom, said ring optionally comprises 1 to 5 substituents selected from halogen, $C_{1-6}$alkyl, $C_{1-6}$alkoxy and $C_{6-10}$aryl.

16. The method according to claim 15, wherein $R_a$ and $R_b$ in the formula (II) independently represent $C_{1-20}$alkyl or $C_{2-20}$alkenyl, or $C_{6-10}$aryl, said groups are optionally substituted with 1 to 3 substituents selected from halogen and $C_{1-6}$alkoxy.

17. The method according to claim 15, wherein the secondary amine is a compound selected from the group comprising dimethylamine, diethylamine, dipropylamine, di-n-butylamine, diisobutylamine, dipentylamine, dihexylamine, diheptylamine, dioctylamine, dicyclohexylamine, N,N-butylisopropylamine, dibenzylamine, methylbenzylamine, methylhexylamine, ethylhexylamine.

18. The method according to claim 15, wherein the secondary amine is a compound selected from the group comprising: pyrrolidine, piperidine, hexamethyleneimine, 2-methylpiperidine, morpholine, thiomorpholine, N-methylpiperazine, N-phenylpiperazine.

19. The method according to claim 1, wherein the diene-containing compound is selected from the group consisting of conjugated dienes having 4 to 12 carbon atoms.

20. The method according to claim 1, wherein the initiator is used in an amount of 1 to 50 mole/t of the rubber.

21. The method according to claim 1, wherein the polyfunctional silicon-containing agent is a compound of the general formula (III):

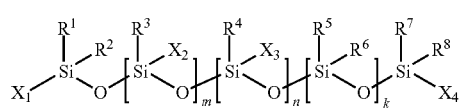
(III)

wherein $R^1$-$R^8$ are the same or different and represent alkoxy groups having an alkyl $C_1$-$C_{20}$ or aryl $C_6$-$C_{12}$ groups; $X_1$-$X_4$ are the same or different and represent epoxy, epoxy$C_{1-20}$ aoalkyl epoxy$C_{1-20}$alkylene-oxoalkyl or epoxy$C_{6-12}$aryl groups,

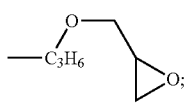

m, n, k are the same or different and represent an integer of from 0 to 500.

22. The method according to claim 1, wherein the silicon-containing agent is used in an amount from 0.01 to 10 wt. %.

23. The method according to claim 1, wherein the (co)polymerization is carried out at temperature from (−30) ° C. to (+120) ° C.

24. The method according to claim 1, further comprising introducing an electron-donor additive to the reaction mixture.

25. The method according to claim 13 or claim 24, wherein the electron-donor additive is selected from the group consisting of ethers and tertiary amines having a boiling point that is lower than 80° C.

26. The method according to claim 25, wherein the electron-donor additive is selected from the group consisting of bis-(2-oxolanyl)methane, 2,2-bis-(2-oxolanyl)propane, (ditetrahydrofurylpropane-DTHFP), 1,1-bis(2-oxolanyl)ethane, 2,2-bis-(2-oxolanyl)butane, 2,2-bis(5-methyl-2-oxolanyl)propane, 2,2-bis(3,4,5-trimethyl-2-oxolanyl)propane, tetrahydrofuran, dialkyl ethers of mono- and oligoalkylene glycols, crown ethers and tertiary amines.

27. The method according to claim 1, comprising:
feeding to a polymerization reactor:
i) at least one diene monomer,
ii) optionally at least one vinylaromatic monomer,
iii) a vinyl-silicon compound;
introducing a functionalizing initiator to a reaction mixture in the polymerization reactor; and
introducing a polyfunctional silicon-containing agent to the reaction mixture until a conversion degree of at least one monomer and the vinyl-silicon compound both reaches 95% and more.

28. A rubber obtained by the method according to claim 1.

29. The rubber according to claim 28, wherein a content of 1,2-units is from about 50 to about 80 wt. % based on the diene portion of the rubber.

30. The rubber according to claim 28, wherein a number-average molecular weight of the rubber $M_n$ is from 50000 to 500000.

31. A rubber composition comprising the rubber according to any one of claims 28 to 30 and at least one functional additive.

32. The composition according to claim 31, wherein the functional additive is selected from the group consisting of a reinforcing filler, an oil, a vulcanizing agent, a plasticizer, a softener, an antideteriorant, an antiozonant, an antifatigue, an additive improving the dispersion of fillers and processability of the composition, and combinations thereof.

33. A composition suitable for producing rubber articles, comprising:
rubber obtained by the (co)polymerization of at least one diene monomer and optionally at least one vinylaromatic monomer and a vinyl silicon compound in the presence of a functionalizing lithium initiator and by the subsequent modification of the (co)polymer by a polyfunctional silicon-containing agent, wherein the functionalizing lithium initiator is obtained by reacting an organolithium compound, a secondary amine and a diene-containing compound, and
at least one functional additive.

34. The composition according to claim 33, wherein the functional additive is selected from the group consisting of a reinforcing filler, an oil, a vulcanizing agent, a plasticizer, a softener, an anti-deteriorant, an antiozonant, an anti-fatigue, an additive improving the dispersion of fillers and processability of the composition, and combinations thereof.

35. The composition according to claim 34, wherein the reinforcing filler is silicon dioxide and/or carbon black.

36. The composition according to claim 33, further comprising butadiene and/or styrene and/or isoprene rubber.

37. A semi-finished product for tire, comprising the composition according to claim 31.

38. The semi-finished product according to claim 37, wherein the semi-finished product is selected from a tread, a breaker or a sidewall.

39. A tire tread comprising the composition according to claim 31.

40. A tire comprising the composition according to claim 31.

* * * * *